(12) United States Patent  
Petersen

(10) Patent No.: US 9,997,999 B2  
(45) Date of Patent: Jun. 12, 2018

(54) CAPACITIVE DC POWER TRANSFORMER

(71) Applicant: Dialog Semiconductor GmbH, Kirchheim/Teck-Nabern (DE)

(72) Inventor: Holger Petersen, Pastetten (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 882 days.

(21) Appl. No.: 14/314,271

(22) Filed: Jun. 25, 2014

(65) Prior Publication Data

US 2015/0015088 A1    Jan. 15, 2015

(30) Foreign Application Priority Data

Jul. 11, 2013 (EP) ..................... 13176210

(51) Int. Cl.
*H02M 3/07* (2006.01)
*H02M 1/15* (2006.01)

(52) U.S. Cl.
CPC .............. *H02M 3/07* (2013.01); *H02M 1/15* (2013.01); *H02M 2003/071* (2013.01); *H02M 2003/072* (2013.01)

(58) Field of Classification Search
CPC ..................... H02M 3/07; H02M 2003/072
See application file for complete search history.

(56) References Cited

U.S. PATENT DOCUMENTS 5,095,223 A * 3/1992 Thomas ................. H02M 3/07 307/110
5,532,916 A   7/1996 Tamagawa
5,581,454 A   12/1996 Collins (Continued)

FOREIGN PATENT DOCUMENTS

DE   10 2007 014 384   10/2008
DE   102007014384   10/2008

(Continued)

OTHER PUBLICATIONS

EPO Communication, Applicantion No. 13 176 210.6 - 1809, 9 pgs., Applicant: Dialog Semiconductor GmbH, dated Dec. 23, 2016.

(Continued)

*Primary Examiner* — Thienvu Tran
*Assistant Examiner* — Pinping Sun
(74) *Attorney, Agent, or Firm* — Saile Ackerman LLC; Stephen B. Ackerman

(57) ABSTRACT

The present document relates to power transformers for electronic computing devices. In particular, a power converter configured to convert electrical power at a DC input voltage Vin into electrical power at a DC output voltage is described. The power converter comprises a plurality of flying capacitors, and a plurality of switches which are configured to arrange the plurality of flying capacitors in accordance to a sequence of operation phases. The power converter comprises a control unit configured to control the plurality of switches to repeat the sequence of operation phases at a duty cycle frequency. The plurality of flying capacitors is arranged in series during the operation phases of the sequence of operation phases. The sequence of operation phases comprises at least two operation phases during which the plurality of flying capacitors is arranged in a different order.

24 Claims, 18 Drawing Sheets

(56) References Cited

U.S. PATENT DOCUMENTS

| | | | |
|---|---|---|---|
| 5,841,648 A | 11/1998 | Mansfield | |
| 6,370,046 B1* | 4/2002 | Nebrigic | H02M 3/07 327/536 |
| 6,504,422 B1* | 1/2003 | Rader | H02M 3/07 327/536 |
| 6,538,907 B2 | 3/2003 | Hoshino et al. | |
| 6,563,235 B1* | 5/2003 | McIntyre | H02M 3/07 307/109 |
| 7,612,603 B1* | 11/2009 | Petricek | H02M 3/07 307/109 |
| 7,696,735 B2 | 4/2010 | Oraw et al. | |
| 7,746,041 B2 | 6/2010 | Xu et al. | |
| 8,179,728 B2 | 5/2012 | Cornwell | |
| 8,330,436 B2 | 12/2012 | Oraw et al. | |
| 8,519,788 B2 | 8/2013 | Khlat | |
| 8,582,333 B2 | 11/2013 | Oraw et al. | |
| 8,618,868 B2 | 12/2013 | Khlat et al. | |
| 2007/0296383 A1 | 12/2007 | Xu et al. | |
| 2009/0072800 A1* | 3/2009 | Ramadass | H02M 3/07 323/271 |
| 2009/0323378 A1* | 12/2009 | Melse | H02M 3/07 363/60 |
| 2010/0026264 A1 | 2/2010 | Ben-Yaakov et al. | |
| 2010/0181973 A1 | 7/2010 | Pauritsch et al. | |
| 2012/0001683 A1* | 1/2012 | Wang | H02M 3/07 327/536 |
| 2013/0257277 A1* | 10/2013 | Zudrell-Koch | H05B 33/0815 315/112 |
| 2014/0184189 A1 | 7/2014 | Salem | |

FOREIGN PATENT DOCUMENTS

| | | |
|---|---|---|
| EP | 0 461 717 | 12/1991 |
| JP | H08205524 | 8/1996 |
| WO | WO 2008/103838 | 8/2008 |
| WO | WO2010052610 | 5/2010 |

OTHER PUBLICATIONS

European Search Report 13176210.6-1809 dated Nov. 18, 2013.
European Search Report 13176210.6-1809 dated Apr. 2, 2014.

"Switched-Capacitor Converters with Multiphase Interleaving Control," by Sitthisak Kiratipongvoot et al., Energy Conversion Congress and Exposition (ECCE), 2011 IEEE, Sep. 2011, pp. 1156-1161.

"New Switched-Capacitor DC-DC Converter with Low Input Current Ripple and Its Hybridization," by Tohru Umeno et al., Circuits and Systems, 1990., Proceedings of the 33rd Midwest Symposium, Aug. 1990, pp. 1091-1094.

"Switched-Capacitor-Based DC-to-DC Converter with Improved Input Current Waveform," by Henry Chung et al., Circuits and Systems, 1996. ISCAS '96. Connecting the World, 1996 IEEE International Symposium, May 1996, pp. 541-544.

"A New Serial Fix Type Switched-Capacitor DC-DC Converter with a Low Ripple Input-Current," by Shoji Suzuki et al., Power Electronics Specialists Conference, 1998. PESC 98 Record 29th Annual IEEE (vol. 2), May 1998, pp. 1517-1522.

"Charge Pumps: An Overview," by Louie Pylarinos et al., Proceedings of the IEEE International Symposium on Circuits and Systems, May 2003, 7 pgs.

"Switched-Capacitor DC-DC Converter: Superior where the Buck Converter has Dominated," by Vincent Wai-Shan Ng et al., Electrical Engineering and Computer Sciences, University of California at Berkeley, Technical Report No. UCB/EECS-2011-94, Aug. 17, 2011, 128 pgs.

High-Efficiency, Regulated Charge Pumps for High-Current Applications, by Brigitte Kormann, Copyright 2002, Texas Instruments Incorporated, 15 pgs.

" A New Approach to Reducing Output Ripple in Switched-Capacitor-Based Step-Down DC-DC Converters," by Jifeng Han et al., IEEE Transactions on Power Electronics, vol. 21, No. 6, Nov. 2006, pp. 1548-1555.

"Charge Pump Circuits: An Overview on Design Strategies and Topologies," by Gaetano Palumbo et al., IEEE Circuits and Systems Magazine, vol. 10, Issue 1, First Quarter 2010, (Mar. 15, 2010), pp. 31-45.

European Search Report, Application Number: 13176210.6-1809, Applicant: Dialog Semiconductor GmbH, dated Apr. 2, 2014, 15 pgs.

European Search Report, Application Number: 13176210.6-1809, Applicant: Dialog Semiconductor GmbH, dated Nov. 18, 2013, 8 pgs.

* cited by examiner

CAPACITIVE DC POWER TRANSFORMER

TECHNICAL FIELD

The present document relates to power transformers. In particular, the present document relates to power transformers for electronic computing devices.

BACKGROUND

The majority of modern portable communication and computing devices (such as mobile phones, smartphones, tablet computers, etc.) are supplied from a battery pack with one or more battery cells connected in parallel. In many cases these battery cells are Li-Ion based cells, which deliver the effective battery capacity at a typical output voltage of approx. 3.7V (e.g. in the range of 3.2-4.2V). The processor IC (integrated circuit) of such computing devices is typically an important power sink, especially when the computing device is executing high performance computing tasks such as internet browsing, high resolution video and/or gaming. The central processing units (CPU) and graphic processing units (GPU) of the processor IC, as well as the required memory (DDR) are typically biased at voltages in the range of less than 1.8V. The rails for these biased voltages are typically generated using regulators inside a power management unit (PMU). In view of the high current demand of modern application processors (up to multiple Amperes per rail) these regulators are typically implemented as inductor-based switching buck converters. An inductor-based switching buck converter may convert power from the input voltage to the output voltage by regulating the duty cycle of a power switch comprised within the converter. By doing this, power may be converted in a more efficient way than by using linear regulators that dissipate power proportional to the voltage drop from input voltage to output voltage.

Another important power sink of modern electronic devices is the LCD backlight of a panel or display. The power required by the LCD backlight typically increases with the growing size and resolution of the panel. The backlight is typically implemented via one or multiple strings of serial LEDs, which are supplied with 12-60V supply voltage. This high voltage rail is typically generated via a switching inductor-based boost converter. Especially for large displays, the backlight dissipation power can be in a similar range or even higher than the average power needed for the application processor and memory.

Battery supplied electronic devices have a limited mobility time defined by the battery pack capacity, the average power consumption and the efficiency of the regulators used within the electronic devices. The maximum battery capacity is typically limited by the dimensions of the electronic device. The limited battery capacity leads to restrictions for the selection of the LCD panel size/resolution and the required maximum and average device computing performance. Furthermore, the total dissipation power of the power sinks may reach the thermal budget of fan-less computing devices like smartphones and tablet computers. Other portable computers (like notebooks and netbooks) may be forced to implement dedicated cooling systems to prohibit a device overheating at high computational load and/or at high display brightness.

In view of the above, there is a need for power efficient regulators, which may be used to derive electrical power at different voltages from the electrical power provided by a battery pack.

SUMMARY

According to an aspect, a power converter is described. The power converter may be referred to as a switched capacitor power converter or power transformer. In particular, the power converter may make use of a plurality of flying capacitors to convert electrical power at a DC (Direct Current) input voltage Vin into electrical power at a DC output voltage Vout. The power at the DC input voltage may be provided by a battery (e.g. by the battery of an electronic device, such as a smartphone or a tablet PC).

The power converter may comprise a plurality of flying capacitors (also referred to as switching capacitors). The plurality of flying capacitors may comprise two or more capacitors. In particular, the plurality of flying capacitors may comprise at least three capacitors. The capacitance of the plurality of flying capacitors may be substantially equal. In other words, the variance of the capacitance of the plurality of flying capacitance may be below a pre-determined variance threshold value. The flying capacitors may be capacitors, of which the arrangement may be modified. In other words, the power converter may be configured to modify the arrangement of the plurality of flying capacitors. This is in contrast to so called reservoir capacitors, the arrangement of which is typically fixed.

Furthermore, the power converter may comprise a plurality of switches which is configured to arrange the plurality of flying capacitors in accordance to a sequence of (different) operation phases (also referred to as "normal phases"). The sequence of operation phases may comprise a plurality of different operation phases and the plurality of flying capacitors may be arranged differently within each of the different operation phases. In particular, the plurality of flying capacitors may be arranged in series during (all of) the operation phases of the sequence of operation phases. In other words, the plurality of flying capacitors may never be arranged in parallel. However, the sequence of operation phases may comprise at least two operation phases during which the plurality of flying capacitors is arranged in a different order. As such, the sequence of operation phases may comprise at least two operation phases with a different serial arrangement of the plurality of flying capacitors. In particular, the different serial arrangements may be such that a different subset of flying capacitors is arranged in parallel to the input voltage Vin (in case of voltage up-conversion) or in parallel to the output voltage Vout (in case of voltage down-conversion). By doing this, it may be ensured that the input voltage is converted into the output voltage at a reduced input current ripple. As a result, the power converter may be used for noise sensitive applications such as smartphones and/or tablet PCs.

Furthermore, the power converter comprises a control unit configured to control the plurality of switches to repeat the sequence of operation phases at a duty cycle frequency. The sequence of operation phases may be such that electrical power at the input voltage Vin (i.e. power from the input of the power converter) is converted into electrical power at the output voltage Vout (i.e. is provided as power to the output of the power converter). In particular, the sequence of operation phases may be such that by changing the arrangement of the plurality of flying capacitors, the electrical power is carried by the flying capacitors from the input towards the output of the power converter.

In case of a voltage down-conversion (for which the output voltage Vout is smaller than the input voltage Vin), the serial arrangement of flying capacitors may be arranged in parallel to the input voltage Vin during (all of) the operation phases of the sequence of operation phases. Furthermore, the sequence of operation phases may comprise at least two operation phases during which different subsets of the plurality of flying capacitors are arranged in parallel to the output voltage Vout. In particular, the sequence of operation phases may be such that during each of the plurality of operation phases a different subset of the plurality of flying capacitors is arranged in parallel to the output voltage Vout.

On the other hand, in case of a voltage up-conversion (for which the output voltage Vout is greater than the input voltage Vin), the serial arrangement of flying capacitors may be arranged in parallel to the output voltage Vout during (all of) the operation phases of the sequence of operation phases. The sequence of operation phases may comprise at least two operation phases during which different subsets of the plurality of flying capacitors are arranged in parallel to the input voltage Vin. In particular, the sequence of operation phases may be such that during each of the plurality of operation phases a different subset of the plurality of flying capacitors is arranged in parallel to the input voltage Vin.

It should be noted that in case of inversion (where the input voltage Vin and the output voltage Vout have an opposed polarity), only a subset of the serial arrangement of flying capacitors is arranged in parallel to the input voltage Vin (in case of voltage down-conversion) or the output voltage Vout (in case of voltage up-conversion) during the operation phases of the sequence of operation phases.

The operation phases of the sequence of operational phases may be such that within each of the sequence of operation phases at least one of the plurality of flying capacitors is charged and at least another one of the plurality of flying capacitors is discharged. In other words, the plurality of flying capacitors may be arranged such that a concurrent charging of at least one of the plurality of flying capacitors and discharging of at least another one of the plurality of flying capacitors occurs. By doing this, a ripple of the input voltage/input current and/or of the output voltage/output current may be reduced.

Within each of operation phase of the sequence of operation phases, a first subset of the plurality of flying capacitors may form a charging network which is being charged, i.e. a charging network comprising one or more flying capacitors which are being charged to draw electrical power from the input of the power converter. Furthermore, within each operation phase of the sequence of operation phases a second subset of the plurality of flying capacitors, which may be complementary to the first subset, may form a discharge network which is being discharged, i.e. a discharge network comprising one or more flying capacitors which are being discharged to provide electrical power to the output of the power converter. As such, during each of the plurality of operation phases, a first subset of flying capacitors may be charged and a second (complementary) subset of flying capacitors may be discharged, thereby allowing for a smooth transfer of the electrical power from the input to the output of the power converter. The discharge network and the charging network (comprising one or more flying capacitors each) may form a dynamically re-arranged voltage divider between the input voltage Vin and the output voltage Vout and ground GND. The voltage ratio of the voltage divider is typically defined by the numbers of serial flying capacitors inside the discharge string (also referred to as discharge network) and the total number of flying serial capacitors. In some cases, the voltage ratio may be defined by the number of serial capacitors inside the charging network instead of the total number of serial flying capacitors.

The sequence of operation phases may be such that each of the plurality of flying capacitors is part of the charging network at least during one of the plurality of operation phases and is part of the discharge network at least during another one of the plurality of operation phases. By doing this, it may be ensured that each of the plurality of flying capacitors participates in the transfer of energy from the input to the output of the power converter. Furthermore, the sequence of operation phases may be such that a particular flying capacitor enters the discharge network only subsequent to having been charged. In other words, the sequence of operation phases may be such that it is ensured that an operation phase during which a particular flying capacitor is part of the discharge network is directly preceded by an operation phase during which the particular flying capacitor is part of the charging network. This may be beneficial with respect to reducing non-adiabatic losses.

The operation phases of the sequence of operation phases may have respective phase durations. The phase durations may be equal for all of the operation phases of the sequence of operation phases (notably if the capacitances of all of the plurality of flying capacitors are equal). In more general terms, the phase duration of a particular operation phase may depend on the capacitance of the one or more flying capacitors which form the discharge network during the particular operation phase. Furthermore, the phase durations may be sufficiently long to ensure a charging of the one or more flying capacitors which form the charging network during the respective operation phase.

The power converter may further comprise a first reservoir capacitor (also referred to as a high side reservoir capacitor) arranged in parallel to the charging network. Alternatively or in addition, the power converter may comprise a second reservoir capacitor (also referred to as a low side reservoir capacitor) arranged in parallel to the discharge network. The first, and second reservoir capacitors may form a static voltage divider between the input voltage Vin, the output voltage Vout and ground GND. The static voltage divider provided by the first and second reservoir capacitors may be used to maintain the voltage ratio of the flying capacitor network during transition phases. Typically, the arrangement of the first and/or second reservoir capacitor remains unchanged during the sequence of operation phases. In case of a voltage down-conversion, the second reservoir capacitor may be arranged in parallel to the output voltage Vout, and the serial arrangement of the first and second reservoir capacitors may be arranged in parallel to the input voltage Vin. In case of a voltage up-conversion, the second reservoir capacitor may be arranged in parallel to the input voltage Vin and the serial arrangement of the first and second reservoir capacitors may be arranged in parallel to the output voltage Vout. The first and/or second reservoir capacitors may be used to reduce the ripple of an input current (at the input voltage) and/or an output voltage of the power converter.

The first and/or second reservoir capacitors may each have a capacitance which is substantially smaller than the capacitance of each of the plurality of flying capacitors inside the charging or discharge network (e.g. 10% or less, 20% or less, or 50% or less than the capacitance of a flying capacitor). The selection of relatively small reservoir capacitors may be used to reduce non-adiabatic losses of the power converter.

As indicated above, if the power converter comprises the first and second reservoir capacitors, the first and second reservoir capacitors may be arranged in series. The use of such a serial arrangement of first and second reservoir capacitors may lead to an input current drawn from a power supply at the input of the power converter, which is substantially constant.

The control unit may be configured to control the plurality of switches to arrange the plurality of flying capacitors in accordance to at least one intermediate phase between a first and a succeeding second operation phase of the sequence of operation phases. During the intermediate phase, a first flying capacitor which is part of the discharge network during the first operation phase and which is part of the charging network during the second operation phase may be arranged in parallel to a second flying capacitor which is part of the charging network during the first operation phase and which is part of the discharge network during the second operation phase operation phase. In other words, the intermediate phase may ensure that a (discharged) flying capacitor is not removed from the discharge network before a (charged) flying capacitor from the charging network has been connected in parallel. Alternatively the intermediate phase may ensure that a (charged) flying capacitor is not removed from the charging network before a (discharged) flying capacitor from the discharge network has been connected in parallel. As such during the intermediate phase the first flying capacitor and the second flying capacitor may be part of the charging network, or may be part of the discharge network. An intermediate phase may be provided between each pair of succeeding operation phases. The one or more intermediate phases may be used to reduce the variations/ripple on the input and/or output currents of the power converter. Furthermore, the one or more intermediate phases may be used to replace the first and/or second reservoir capacitors, thereby reducing the cost and the size of the power converter.

A mid-point between the charging network and the discharge network may be (directly) coupled to a reference potential of the input voltage Vin. The reference potential of the input voltage Vin may correspond to ground (GND). By doing this, the input voltage Vin and the output voltage Vout may be provided with inverse polarity.

The plurality of flying capacitors may comprise $N_T$ flying capacitors ($N_T>1$, e.g. $N_T>2$ or $N_T>4$). The charging network may comprise $N_C$ flying capacitors ($N_C>0$, e.g. $N_C>1$ or $N_C>2$). The discharge network may comprise $N_D$ flying capacitors, with $N_T=N_C+N_D$ ($N_D>0$, e.g. $N_D>1$ or $N_D>2$). A conversion ratio of the power converter may depend on $N_T$ and $N_D$. In particular, by selecting different numbers for $N_T$ and $N_D$, different conversion ratios may be provided. In particular, a (target) ratio of the input voltage Vin and the output voltage Vout may correspond to $N_D/N_T$ for voltage down-conversion and/or $N_T/N_D$ for voltage up-conversion and or $-N_D/N_C$ in case Vout is provided with inverse polarity.

The sequence of operation phases may comprise at least (e.g. comprise exactly) $N_T$ operation phases. The operation phases may be such that each of the plurality of flying capacitors is part of the charging network for at least (e.g. for exactly) $N_C$ phases and part of the discharge network for at least (e.g. for exactly) $N_D$ phases. By way of example, the sequence of operation phases may be such that each of the plurality of flying capacitors appears at each position along the serial arrangement of flying capacitors at least (e.g. exactly) within one operation phase of the sequence of operation phases. In particular, the flying capacitors may move down or up the serial arrangement of flying capacitors at between succeeding operation phases of the sequence of operation phases. Furthermore, the sequence of operation phases may be such that a particular flying capacitor enters the discharge network only subsequent to having been charged. This may be implemented by moving the flying capacitors by $N_C$ or $N_D$ (or a multiple thereof) locations up and/or down inside the serial arrangement. In other words, the sequence of operation phases may be such that it is ensured that an operation phase during which a particular flying capacitor is part of the discharge network is directly preceded by an operation phase during which the particular flying capacitor is part of the charging network. This may be beneficial with respect to reducing non-adiabatic losses.

The control unit may be configured to control the plurality of switches to arrange the plurality of flying capacitors in accordance to at least one transition phase for transiting from a first to a succeeding second operation phase of the sequence of operation phases. A transition phase may be provided between each pair of succeeding operation phases. During the at least one transition phase, at least one of the plurality of flying capacitors (e.g. all the flying capacitors which are swapped between charging network and discharge network) may be decoupled from the input voltage Vin and from the output voltage Vout. The control unit may be configured to keep the duration of a transition phase low. In particular, a ratio between the duration of a transition phase and the duration of an operation phase may be kept at or below a pre-determined duration threshold. By doing this, ripple on the input current towards the power converter may be reduced.

The control unit may be configured to adapt the duty cycle frequency as a function of the amount of electrical power provided at the DC output voltage. In other words, the duty cycle frequency may be adapted to the amount of electrical power which is drawn at the output of the power converter (i.e. to the load which is coupled to the output of the power converter). The duration of a complete duty cycle may correspond to the duration of a sequence of operation phases. The duty cycle frequency typically corresponds to the number of times the complete sequence of operation phases (including possible transition phases and/or intermediate phases) may be repeated within a pre-determined time interval (e.g. within one second). Increasing the duty cycle frequency typically reduces the ripple on the input current and/or output voltage to and/or from the power converter. On the other hand, increasing the duty cycle frequency may increase the switching losses caused by the switching of the plurality of switches. The control unit may be configured to decrease the duty cycle frequency as the amount of electrical power provided at the DC output voltage Vout decreases. By doing this, the conversion efficiency of the power converter may be maintained at a high level (e.g. at or above 90% or 95%), even in case of a low load at the output of the power converter.

The power converter may be configured to provide multiple configurable conversion ratios. The different conversion ratios may be implemented by replacing a subset of the plurality of flying capacitors with a short cut. In particular, the power converter may comprise a one or more short cut switches configured to bypass or short cut one or more of the plurality of flying capacitors. The control unit may be configured to control the one or more short cut switches, in accordance to the conversion ratio which is to be provided by the power converter. The conversion ratio may be dynamically adapted by closing and/or opening at least one of the one or more short cut switches. In particular, the power converter may be configured to control the conversion ratio from the voltage level at the input voltage Vin and/or at the output voltage Vout.

As such, the power converter may further comprise one or more short cut switches configured to short cut one or more of the plurality of flying capacitors. The control unit may be configured to control the one or more short cut switches in accordance to a conversion ratio between the input voltage and the output voltage, which is to be provided by the power converter. By changing the switching state of the one or more short cut switches, the conversion ratio may be modified dynamically.

According to a farther aspect, a differential power converter configured to convert electrical power at a DC input voltage Vin into electrical power at a differential output voltage is described. Such differential power converters may be used to provide a target conversion ratio using a reduced number of flying capacitors. The differential power converter may comprise a first (capacitive) power converter as described in the present document. The first power converter may be configured to convert the electrical power at the DC input voltage Vin into electrical power at a first DC output voltage. For this purpose, the first power converter may comprise a first number $N_{T1}$ of flying capacitors. Furthermore, the differential power converter may comprise a second (capacitive) power converter as described in the present document. The second power converter may be configured to convert electrical power at a second DC output voltage into electrical power at the DC input voltage. In particular, the second power converter may pull current from the second DC output voltage to the DC input voltage Vin. Hence, the second power converter may be configured to convert electrical power from the second DC output voltage into electrical power at the DC input voltage Vin. For this purpose, the second power converter may comprise a second number $N_{T2}$ of flying capacitors. The first number $N_{T1}$ and the second number $N_{T2}$ of flying capacitors may be different. As a result, the first and second DC output voltages may be different. The differential output voltage of the differential power converter may correspond to a difference of the first and second DC output voltages.

According to a further aspect, the use of a power converter for directly supplying power sinks with electrical energy, wherein the power sinks do not require an accurate voltage level and are not sensitive to amplitude and/or frequency of output voltage ripple (e.g. for a string of LEDs, a battery charger or an audio amplifier). The power converter may have any of the configurations described in the present document.

According to a further aspect, the use of a capacitive power converter for the generation of an intermediate power rail used as an input supply for one or more cascaded regulators is described. The one or more cascaded regulators may be of any type of topology. The capacitive power converter may make use of any kind of capacitive power conversion topology. In a preferred example, the capacitive power converter may have any of the configurations described in the present document. An example for the use of a capacitive power converter is the down-conversion of a multi-cell battery output rail into the voltage range of a single cell battery. The one or more cascaded regulators or phases of a cascaded regulator may be arranged in a way to reduce current ripple. This may be implemented by make use of different switching converters at interleaved clock phases or by making use of interleaved multi-phase regulators.

According to a further aspect, a method for converting electrical power at a DC input voltage Vin into electrical power at a DC output voltage is described. The method may comprise controlling a plurality of switches to repeat a sequence of operation phases at a duty cycle frequency (e.g. in the range of 500 kHz). The plurality of switches may comprise transistors, e.g. metal oxide semiconductor field effect transistors. The plurality of switches may be configured to arrange a plurality of flying capacitors in accordance to the sequence of operation phases. The plurality of flying capacitors may be arranged in series during the operation phases of the sequence of operation phases. Furthermore, the sequence of operation phases may comprise at least two operation phases during which the plurality of flying capacitors is arranged in a different order.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

As outlined in the background section, the present document addresses the technical problem of power efficient regulators, which may be used e.g. for portable computing devices, notably for fan-less computing devices. Such computing devices typically comprise switching regulators. The efficiency of switching regulators typically decreases with the ratio of input-to-output voltage. As a consequence, portable devices with larger screens (like notebooks/netbooks) tend to make use of higher battery voltages by connecting several battery cells of the battery pack in series. The higher nominal battery pack voltage (e.g. approx. 7.4V for 2S packs (i.e. 2 serial battery cells), approx. 11.1V for 3S packs, and approx. 14.8V for 4S packs) decreases the input-to-output voltage ratio and by that improves the regulator efficiency of the display backlight driver. The higher voltage also decreases the average battery discharge and charge currents, which reduces the requirements for the current capability of the battery connector and charging adapter.

On the other hand, a higher battery voltage results in an increased voltage conversion ratio for the low voltage supply rails of the application processor (CPU/GPU) and memory. This has a negative impact on the regulator efficiency. A reduced input-to-output voltage ratio per regulator could be achieved by cascading two or more regulators. However, the drawback of cascading is an increased amount of regulators (plus discrete components like inductors and capacitors) resulting in higher production cost and more PCB (printed circuit board) board space. The overall conversion efficiency results from the multiplication of the individual regulators efficiencies and is typically lower than for regulators being supplied by a battery pack which does not comprise serial cells.

A group of switching regulators is formed by the so called switched mode capacitive power converters. In such capacitive power converters, the voltage transformation may be implemented by connecting several capacitors via switches alternatively in series and in parallel. The result may be a capacitive charge pump. During a first phase the capacitive voltage converter shifts charge from the input supply into an energy buffer (comprising one or more flying or switching capacitors in an appropriate series/parallel configuration), which, during a second phase, is discharged in a different configuration to a reservoir capacitor. By inverting the series/parallel setup from both phases a voltage divider and/or voltage inversion can be implemented as well. The reservoir capacitor may be connected in parallel to the load and may supply the current as long as the flying capacitors are disconnected from the output. Typically, the value of the reservoir capacitor is larger than the value of the switching capacitors.

Figure 1A:
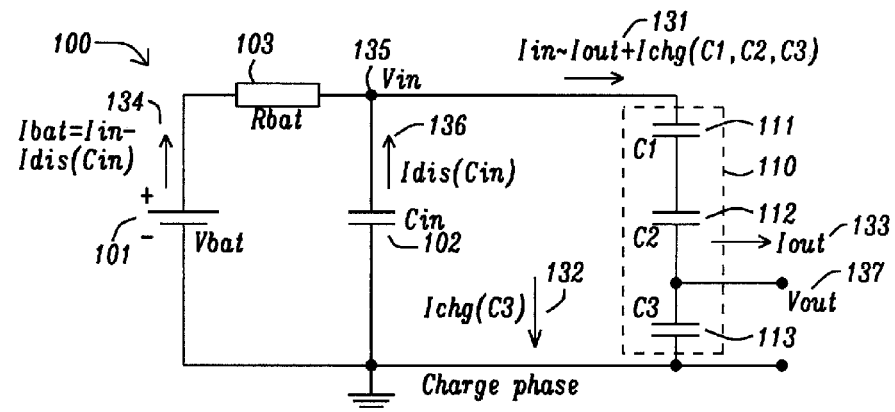
FIGS. 1a to 1c illustrate an example switched capacitor DC-DC converter in different phases.
Figure 1B:
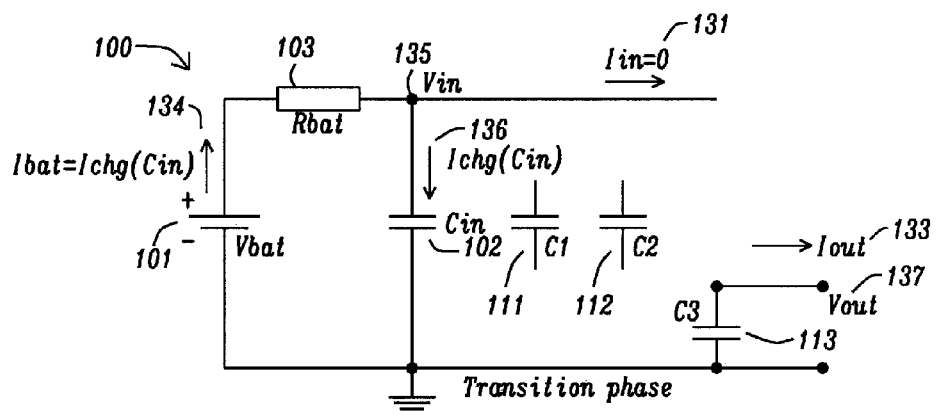
Figure 1C:
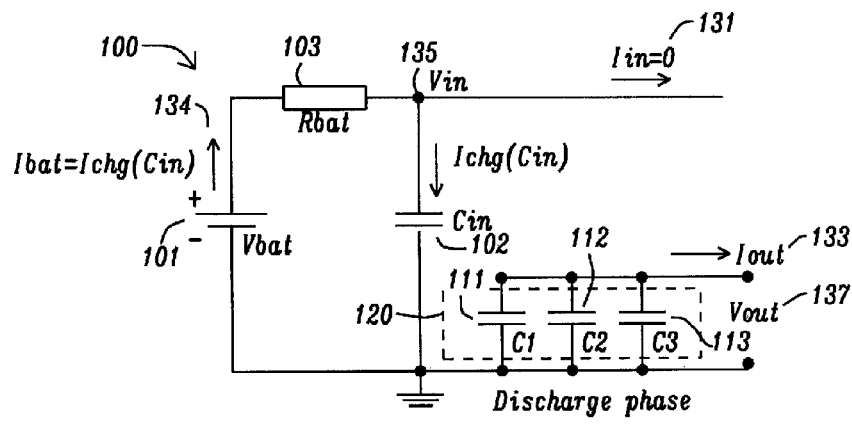

FIGS. 1a to 1c illustrate the operation of an example switched-capacitor voltage divider or switched-capacitor power converter 100. During a $1^{st}$ normal phase (FIG. 1a) a charging network 110 (comprising capacitors C1 111, C2 112, C3 113) is charged from the input supply Vbat 101 (e.g. from the battery pack). The input current Iin 131 into the charging network 110 is defined by the output current Iout 133 (provided to the load) plus the current Ichg (C1, C2, C3) 132 (used for re-charging the capacitors C1 111, C2 112 and C3 113). During a subsequent transition phase (FIG. 1b), the flying capacitors C1 111 and C2 112 are disconnected via switches from the input supply Vbat 101. During the transition phase the output current Iout 133 is provided by the reservoir capacitor C3 113 and the input current Iin 131 is zero. This is followed by a normal discharge phase (FIG. 1c) where the flying capacitors C1 111 and C2 112 are connected in parallel to the reservoir capacitor C3 113 forming a discharge network 120.

During the capacitor discharge phase (FIG. 1c), the output voltage Vout 137 drops with the output current Iout 133. In other words, as the capacitors C1 111, C2 112, C3 113 are being discharged (in accordance to the output current Iout 133), the output voltage Vout 137 decreases. After a certain period the capacitors C1 111 and C2 112 are disconnected in a consecutive transition phase (FIG. 1b) back towards the initial configuration (FIG. 1a). The converter 100 corresponds to an n:1 voltage divider circuit (with n being the number of serial capacitors C1, C2, C3) and implements a 3:1 Vin 135/Vout 137 ratio. In case the transition phases (FIG. 1b) are relatively short in comparison to the normal phases (FIGS. 1a and 1b), the voltage divider duty cycle D of the charge phase is approx. 1/n, resulting in a discharge phase duration of approx. 1−D=1−1/n. Depending on the switching frequency, any duty cycle D larger than the RC time constants for the switches/flying capacitor combinations may be used (in order to ensure a sufficient charging of the charging network 110.

The switched-capacitor converter 100 of FIG. 1 implements a pulsed input power. The peaks of the pulsed input current Iin 131 are in the range of the output current Iout 133 (or greater than n×Iout for a voltage multiplier/boost). In combination with the battery output impedance Rbat 103, the pulsed input current Iin 131 results in a pulsed voltage drop at Vin 135. This discontinuous load may be reduced by adding a filter network (e.g. by adding an input capacitor Cin 102), thereby reducing the battery current Ibat 134 during the duty cycle by the Cin discharge current Idis(Cin) 136. As a result, a charge current Ichg(Cin) 136 is pulled from the battery when the input current Iin=0. A large value of the input capacitor Cin 102 (with a relatively low ESR, equivalent serial resistance) in relation to the maximum output current Iout 133 and the switching frequency may be used to reduce noise injection into other sinks connected to the battery, in order to reduce PCB crosstalk and in order to reduce EMI issues.

It should be noted that the relatively high and discontinuous input current Iin 131 is different from the input current of typical AC-transformers, where the pulled input current Iin is time continuously in the range of approx. Vout/Vin× Iout (despite transformer losses).

In the present document, switched capacitor power converters are described, which (despite the voltage drop inside the converters) may be used to provide input-to-output voltage ratios equal to or greater than 2:1 (or equal to or smaller than 1:2 for boost conversion). Furthermore, changeable input-to-output voltage ratios may be provided.

Power conversion via inductive buck converters may be negatively affected by the relatively shortest on-time $t_{min}$ of available power switches. The regulator switching frequency $F_{sw}$ is typically lower than approx. $1/(t_{min} \times (n+1))$, with n being the largest required input-to-output voltage ratio n:1. However, a lower switching frequency $F_{sw}$ typically increases the output current (and output voltage) ripple which may need to be compensated by the use of a larger inductance. The use of a larger inductance usually requires inductors of bigger size or an increased Direct Current Resistance (DCR) (the first resulting in larger PCB footprint and/or inacceptable inductor height, the latter causing a reduced conversion efficiency). Another limitation may be caused by the switching loss of the converter growing with the input voltage, as the switching loss is mainly proportional to the input voltage Vin and partially increasing in a quadratic manner with Vin. A further impact from increasing input voltage may need to be considered for silicon technology. Silicon switches that are able to block higher voltages usually require more space and by that tend to have a larger parasitic capacitance. During switching this additional capacitance results in increased switching losses.

Power conversion via direct inductor-based buck converters shows its physical limits with the continued trend towards ultra slim devices (as low profile inductors can only handle the required amount of multiple amperes output current Iout at very low inductance). A possible workaround to this problem may be to split the total current per rail into multiple phases that can be equipped with multiple low profile inductors. However, an increased input voltage Vin (as provided by serial battery packs) reduces the maximum switching frequency and by that requires larger or at an increased number of (parallel) inductors per rail (with a negative impact on the size and cost of the required power conversion solution).

Furthermore, inductor-based converters are affected by a significant increase of switching losses triggered by the increased input voltage Vin. For inductor-based buck converters which are operated at fixed frequencies (pulse width modulation), the impact from a 2S battery pack may be less visible at maximum output current Iout. However, at medium and low output current Iout the power conversion efficiency is typically significantly reduced. The medium and low load efficiency may be improved via the dynamic disabling of phases (in case of a multi-phase regulator) or may be compensated by dynamically reducing the switching frequency (pulse frequency modulation). But these measures do not allow implementing in parallel a relatively high power conversion efficiency and a fixed switching frequency required to implement filtering based on resonant filter networks.

As such, the performance, size and cost of inductor-based power conversion is challenged with an increased input-to-output voltage ratio especially when triggered by increased input voltages as available from battery packs with multiple cells contacted in series.

In contrast to the above, the switched capacitor power converters which are described in the present document provide relatively high power conversion efficiency over a wide range of output currents Iout, even for increased input-to-output voltage ratios. Furthermore, the described switched capacitor power converters may provide reduced noise from current ripple on the supply rail and/or on the battery voltage, as well as reduced cross coupling through the PCB and/or via magnetic and electrical fields.

In particular, the described switched capacitor power converters may be configured to remove relatively high current (and voltage) ripple at the switching converter input rail (i.e. at the battery voltage Vbat 101). As a result, voltage converter input noise, crosstalk and/or EMI issues may be reduced. Furthermore, the described switched capacitor power converters may be configured to improve conversion efficiency by reducing the power loss from the output impedance of the input supply (i.e. battery pack). For voltage multiplication applications this reduction of loss may be up to a factor of 50%. For voltage division applications the loss improvement inside the supply may be up to a factor of approx. Vin/Vout (i.e. the ratio of the input voltage 135 and the output voltage 137). In addition, the described switched capacitor power converters remove the need for a large input capacitor Cin 102.

Furthermore, the removal of the input current ripple (noise, etc.) enables the use of variable switching frequency and by that improves power conversion efficiency at light loads. The worst case converter output voltage ripple is typically dependent on the capacitor values and the switching frequency at maximum output current Iout 133. This means that at reduced output current Iout 133 (i.e. at reduced loads), the switching frequency may be reduced. This allows reducing switching losses and by that increasing power conversion efficiency at reduced loads.

With respect to the challenges caused by battery packs with multiple cells in series the described capacitive divider provides an improved voltage transformer dividing the pack output voltage range down to the voltage of e.g. a single cell. In the present document, a switched capacitor DC voltage divider/multiplier is described that transforms a time continuous output current Iout 133 into an approximately time continuous input current Iin 131. The ratio of the currents Iout/Iin is approximately the inverse ratio of the input voltage Vin 135 to the output voltage Vout 137, i.e. Vin/Vout. This is different from typical switched capacitor converters (see e.g. FIG. 1a to 1c), which transform a time continuous output current Iout 133 into a discontinuous input current Iin 131.

In the following an example capacitive voltage divider 200 with an example input-to-output voltage ratio of 3:1 is described with reference to FIGS. 2a to 2f. In the initial phase (FIG. 2a), the voltage divider 200 is similar to the voltage divider 100 of FIG. 1a. During the charging phase (FIG. 1a) of the series-parallel converter 100 the three capacitors C1, C2, C3 are connected in series as a capacitive divider of Vin 135. During the first transition phase (FIG. 1b) several capacitors (capacitors C1 111 and C2 112) are disconnected and re-arranged. In the second normal phase (FIG. 1c), the two flying capacitors C1 111 and C2 112 have been removed from the charging network 110 and are connected in parallel to the reservoir C3 113 within the discharge network 120. At the end of the second normal phase the capacitor arrangement is reverted through the transition phase (FIG. 1b) back to the start configuration of FIG. 1a. Besides the transition phases, the capacitive divider 100 of FIGS. 1a to 1c has exactly one charge phase and exactly one discharge phase (i.e. N=2 normal phases), which are revolved continuously. The charge phase (FIG. 1a) and the discharge phase (FIG. 1c) are mutually exclusive, i.e. when the capacitive divider 100 is in the charge phase, the capacitive divider 100 is not in the discharge phase, and vice versa.

During the discharge phase each of the capacitors C1, C2, C3 is discharged with a fraction of the output current Iout. As a result the capacitors are discharged without non-adiabatic loss. On the other hand, when the discharged capacitors C1, C2, C3 are connected in series the total string voltage is lower than Vbat and the delta voltage dV=Vbat−(V(C1)+V(C2)+V(C3)) triggers non-adiabatic loss during the charging phase (rising with delta current Iin-Iout).

In the voltage divider 100 of FIGS. 1a to 1c, the capacitors C1, C2, C3 are charged with an input current Iin which is greater than the output current Iout. Pulling a high current (i.e. the input current Iin) from the input supply usually triggers increased losses inside the power supply (battery) 101. This loss in generated during the charging phase (during which Iin>Iout), and this loss is quadratic proportional to the input current Iin 131. Because of this, the voltage divider 100 of FIGS. 1a to 1c typically comprises a relatively large input capacitor Cin 102 (with relatively low ESR) to filter the spikes of the current Ibat towards the battery 101 and to reduce the noise emission.

The capacitive transformer 200 of FIGS. 2a to 2f may not require an input capacitor Cin 102 because of a relatively constant input current Iin. In particular, the spikes or peaks of the input current Iin may be reduced compared to the peaks of the input current Iin of the capacitive transformer 100 of FIGS. 1a to 1c.

The capacitive transformer 200 of FIGS. 2a to 2f may make use of a reservoir capacitor Cout 221. The reservoir capacitor Cout 221 may be (substantially) smaller than the switching capacitors C1 111, C2 112, C3 113 (please note that in contrast to the FIGS. 1a to 1c, the capacitor C3 113 of transform 200 is a switching capacitor.

Figure 2A:
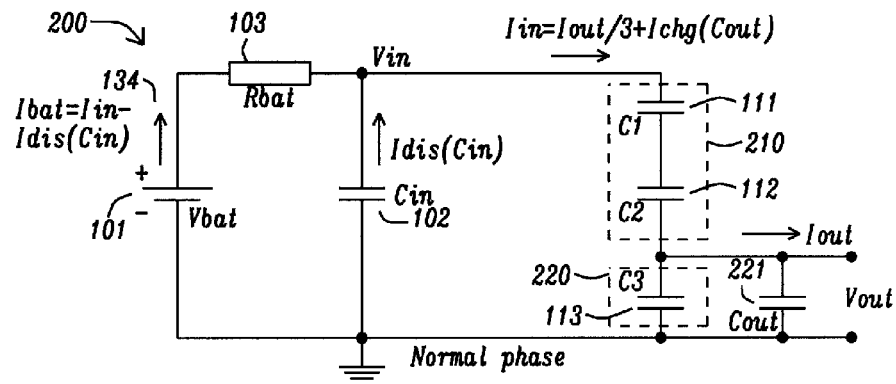
FIGS. 2a to 2f show circuit diagrams of an example switched capacitor DC-DC converter using revolving capacitor switching.
Figure 2B:
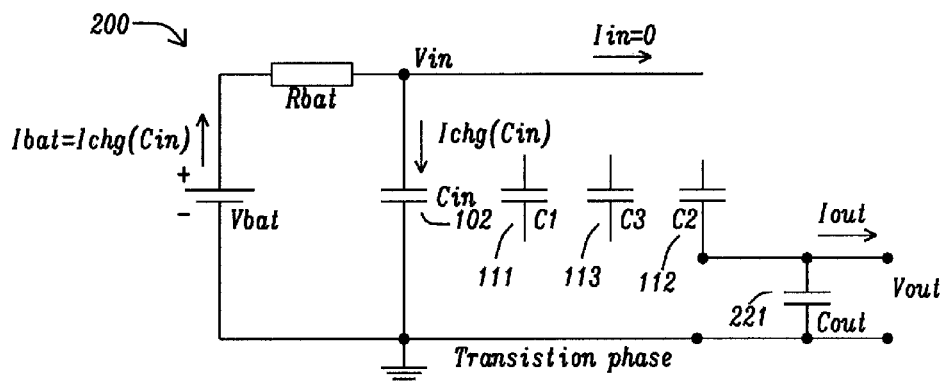

In contrast to the transformer 100 of FIGS. 1a to 1c, the transformer 200 implements a capacitor discharge already within the start phase (FIG. 2a). In other words, the transformer 200 may comprise concurrent discharge and charge phases. In yet other words, the transformer 200 may comprise a charging network 210 and a discharging network 220 which are operated at the same time (i.e. during the same operation phases). As can be seen in FIG. 2b, the switching capacitors C1 111 and C2 112 form the charging network 210 and are charged with the input current Iin. At the same time, the switching capacitor C3 113 from the discharging network 220 provides the output current Iout in combination with the reservoir capacitor Cout 221.

Figure 2C:
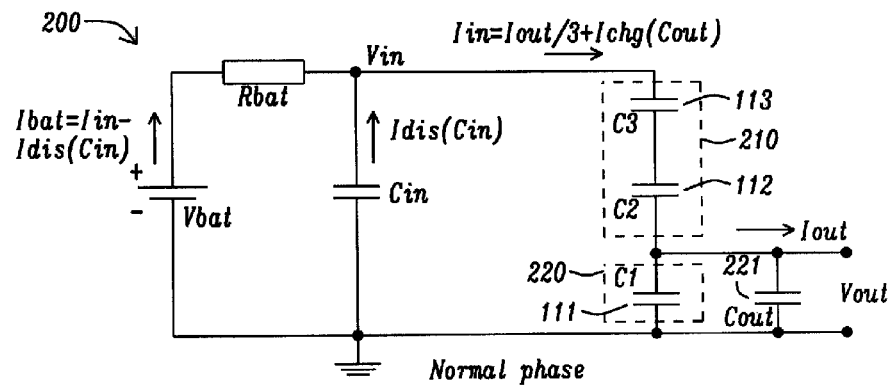
Figure 2D:
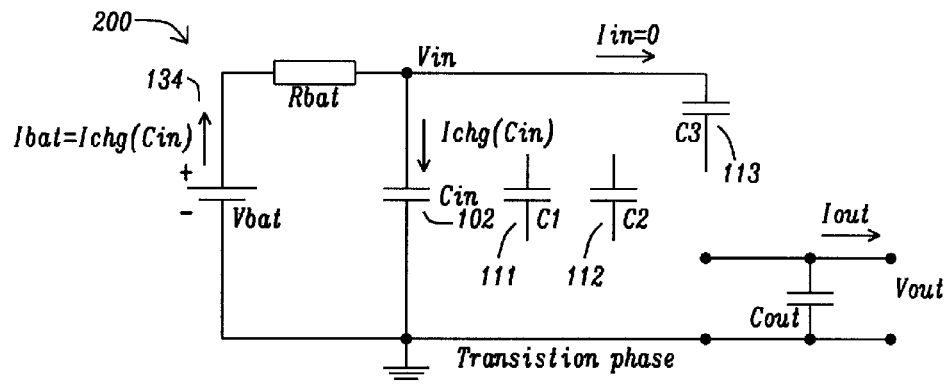

After the transition phase (FIG. 2b), the switching capacitor C3 113 inside the discharging network (or discharge string) 220 is flipping its place with one of the capacitors (i.e. C1 111) inside the charging network (or charging string) 210 (see FIG. 2c). The transformer 200 then passes through a second transition phase (FIG. 2d) towards the next normal phase (FIG. 2e) where one of the switching capacitors (i.e. C2 112) from the charging string 210 is flipping its position with the switching capacitor C1 111 inside the discharge string 220. This capacitor revolving process may progress until all switching capacitors C1 111, C2, 112, C3 113 have been connected ones with the discharge string 220. From then on the capacitive transformer 220 continues from start (see FIG. 2a), which, besides the transition phases, results in an N-phase converter (wherein N may correspond to the number of switching capacitors). The switching frequency of the converter defines the repetition rate of the N-phase sequence (dependent on the amount of flying capacitors C1, C2, C3).

During the start phase (FIG. 2a) of the capacitive DC transformer 200, the switching capacitors C1 111, C2 112 inside the charging string 210 are charged with a duty cycle of D which corresponds approximately to the ratio of Vout/Vin. The charging current Iin corresponds approximately to Iout*D (see FIG. 2a). In parallel, the switching capacitor C3 113 inside the discharge string 220 provides a current of approximately Iout×(1−D) towards the output.

In the next normal phase (of the same duty cycle D, see FIG. 2c) the switching capacitor previously connected to the discharge string (i.e. C3 113) is charged inside the charging string 210. This parallel charge/discharge process is continued for N=1/D phases until each switching capacitor C1, C2, C3 has been connected to the discharge string 220 once. In the example of FIGS. 2a to 2f, each switching capacitor C1, C2, C3 is charged during two normal phases with a current of approximately Iout/3 and discharged during one normal phase with a current of approximately ⅔×Iout.

Figure 2E:
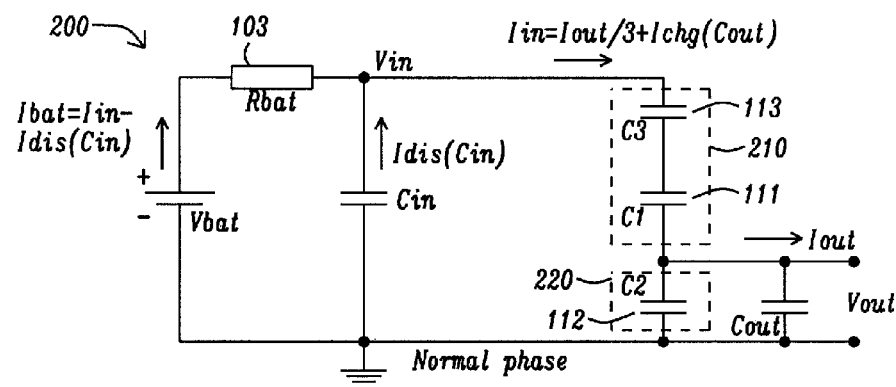
Figure 2F:
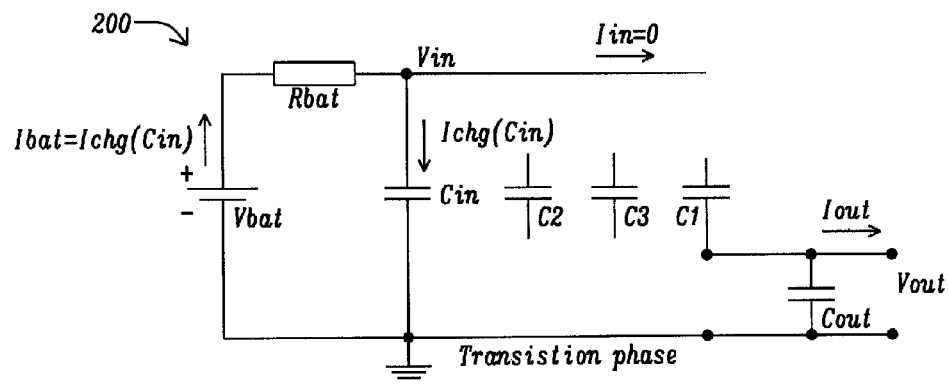

During the transition phases (FIGS. 2b, 2d, 2f) the reservoir capacitor Cout 221 provides the full output current Iout 133. As a consequence, the reservoir capacitor Cout 221 typically needs to be re-charged during the beginning of the next normal phase (FIGS. 2a, 2c, 2e). The charging of the non-flying capacitor (i.e. the charging of the reservoir capacitor Cout 221) is typically non-adiabatic. The transition phases (FIGS. 2b, 2d, 2f) may be configured to be relative short and the reservoir capacitor Cout 221 may be configured to be smaller than each of the switching capacitors C1 111, C2 112, C3 113. By doing this, the charging losses caused by the non-adiabatic charging of the reservoir capacitor Cout 221 may be reduced.

As such, the capacitive transformer 200 described in the present document implements a serial capacitor network that charges and discharges flying capacitors in parallel and doesn't suffer from non-adiabatic loss when charging the flying capacitors. This is different from the transformer 100 of FIGS. 1a to 1c which charges and discharges the flying capacitors at different phases. The number of switching phases N for the transformer 200 increases with the number of flying capacitors C1, C2, C3, but the network of flying capacitors C1, C2, C3 remains a serial string during all normal operation phases. At the same time, the switched-capacitor DC-DC converter 200 may be configured to pull an approximately time continuous input current Iin. In particular, the degree of variations of the input current Iin may be reduced. As a result, the converter 200 behaves similar to an inductive AC power transformer.

Figure 3A:
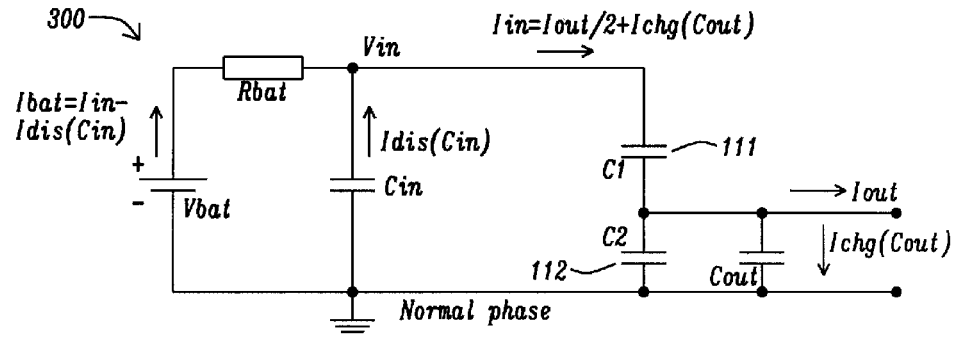
FIGS. 3a to 3c show circuit diagrams of another example switched capacitor DC-DC converter using revolving capacitor switching.
Figure 3B:
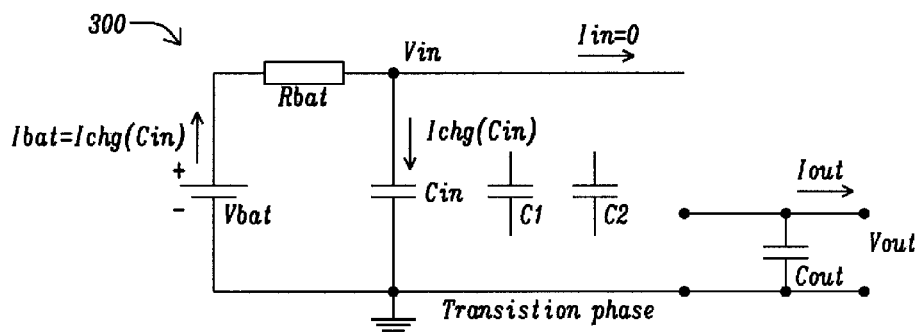
Figure 3C:
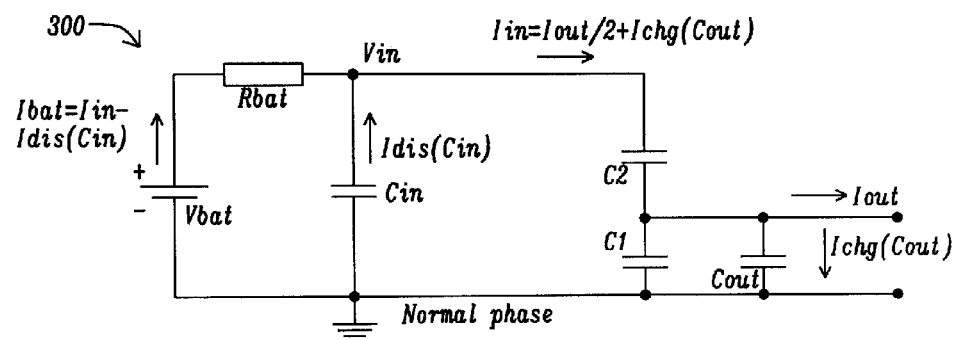

FIGS. 3a to 3c show diagrams of a 2:1 capacitive voltage transformer 300 which makes use of only two flying capacitors 111, 112 and two normal operation phases. The transformer 300 provides a constant input current Iin with the exception of the transition phases (see FIG. 3b). As the transition phases are assumed to be relative short in comparison to the normal phases, the energy which is pulled from and later re-charged to the reservoir capacitor Cout 221 may be assumed to be small (thereby reducing non-adiabatic losses). A relatively small optional input capacitor Cin 102 may be used to reduce the ripple at the input rail caused by the short duration pulses during the transition phases (FIG. 3b).

Figure 4A:
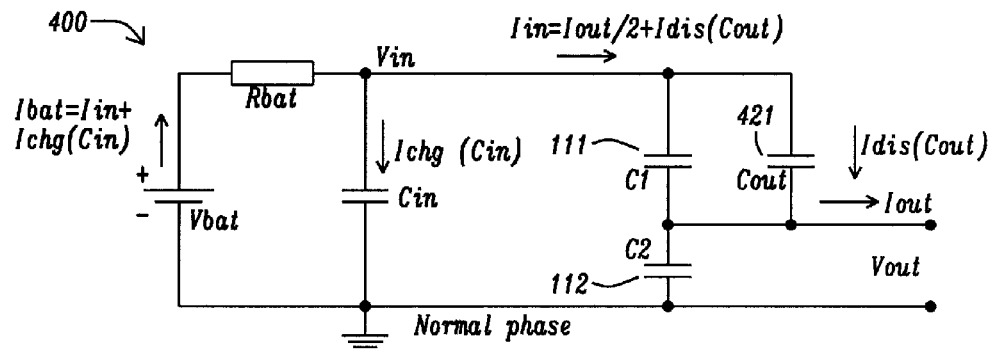
FIGS. 4a to 4c show circuit diagrams of an example switched capacitor DC-DC converter comprising a high side output capacitor.
Figure 4B:
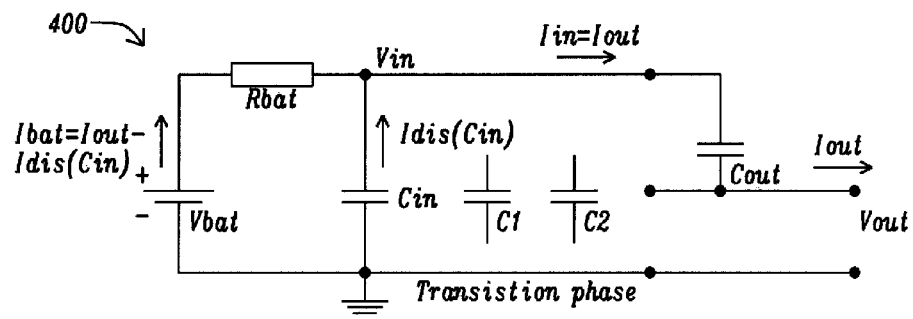
Figure 4C:
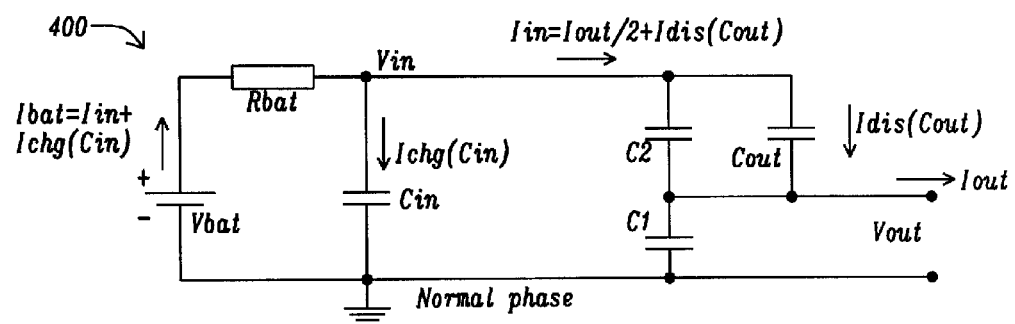

FIGS. 4a to 4c show a capacitive transformer 400 similar to the transformer 300. The capacitive transformer 400 comprises a high side reservoir capacitor Cout 421, which is arranged in parallel to the charging network 210 (comprising the switching capacitor C1 111 in FIG. 4a). For this variant the input current Iin is relatively high (approximately Iout) during the transition phases (FIG. 4b), but the average input current Iin during the normal phases is reduced compared to the input current Iin for the transformer 300. When applying Vin without flying capacitors of the transformer being connected the capacitive connection formed by Cout in between Vout and Vin may trigger (temporally) over-voltage at the output voltage Vout.

Figure 5A:
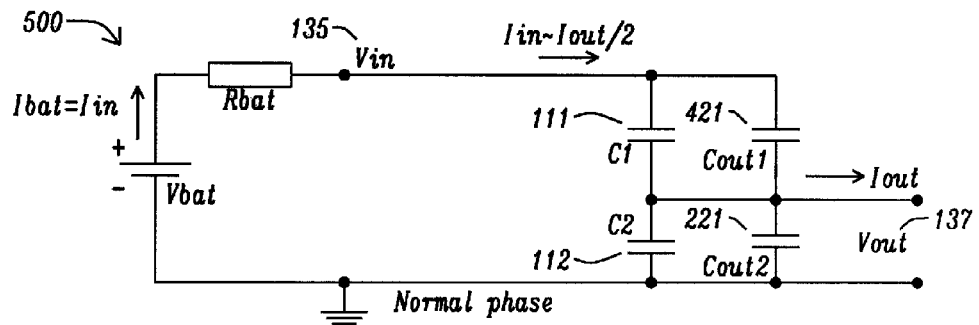
FIGS. 5a to 5c show circuit diagrams of an example switched capacitor DC-DC converter comprising a high side output capacitor and a low side output capacitor.
Figure 5B:
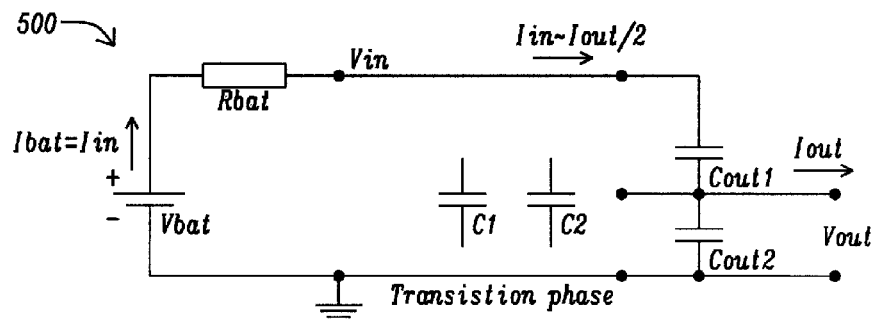
Figure 5C:
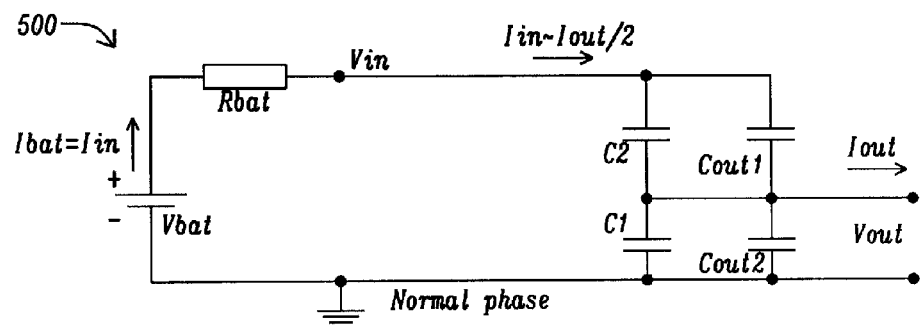

FIGS. 5a to 5c show diagrams of a capacitive transformer 500 which comprises a high side reservoir capacitor Cout1 421 (arranged in parallel to the charging network 210) and a low side reservoir capacitor Cout2 221 (arranged in parallel to the output of the transformer 500). As can be seen from FIGS. 5a to 5c, the transformer 500 does not make use of an input capacitor Cin 102 as the change of the input current Iin during the transition phases is negligible. In particular, it can be seen that the input current Iin remains substantially constant (at approximately Iout/2) during all operation phases of the transformer 500. In particular, if the capacitances of the reservoir capacitors Cout1 421 and Cout2 221 are selected small in comparison to the capacitances of the flying capacitors C1 111 and C2 112, the current spikes and losses from non-adiabatic charging can be neglected.

Figure 6A:
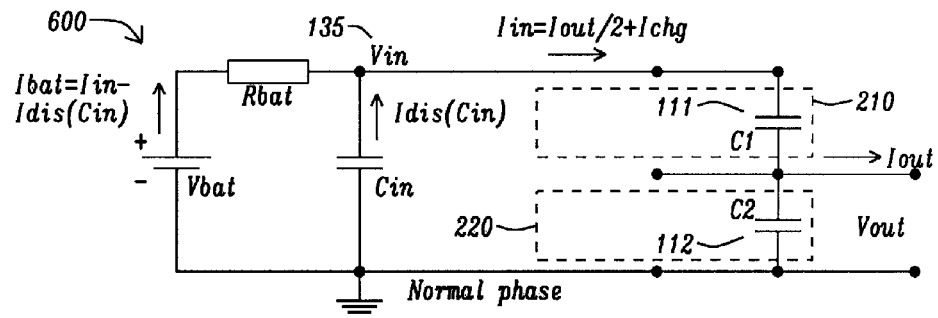
FIGS. 6a to 6e show circuit diagrams of an example switched capacitor DC-DC converter without output capacitor.
Figure 6B:
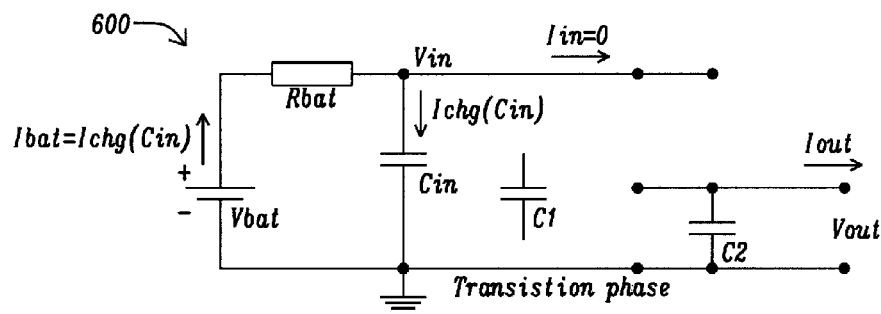
Figure 6C:
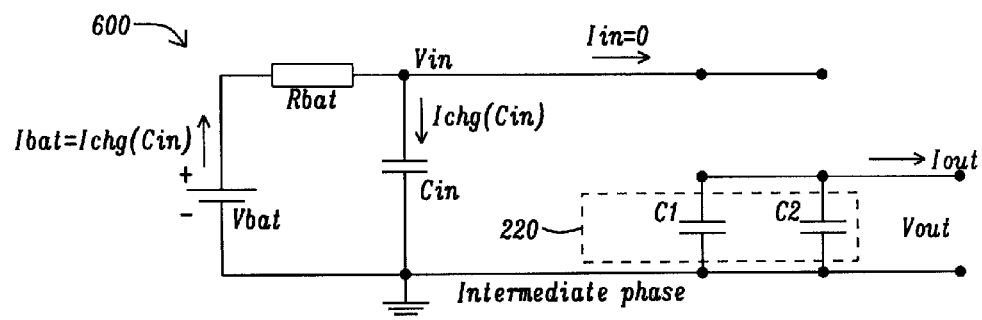
Figure 6D:
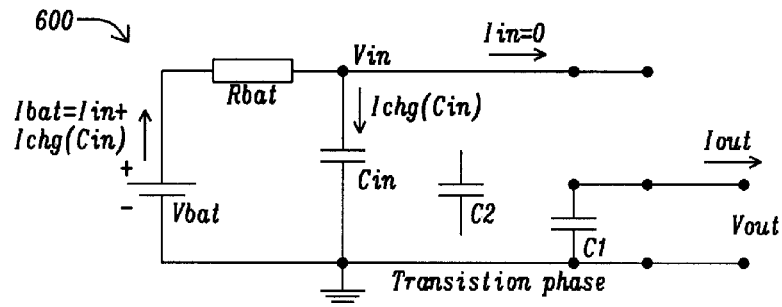
Figure 6E:
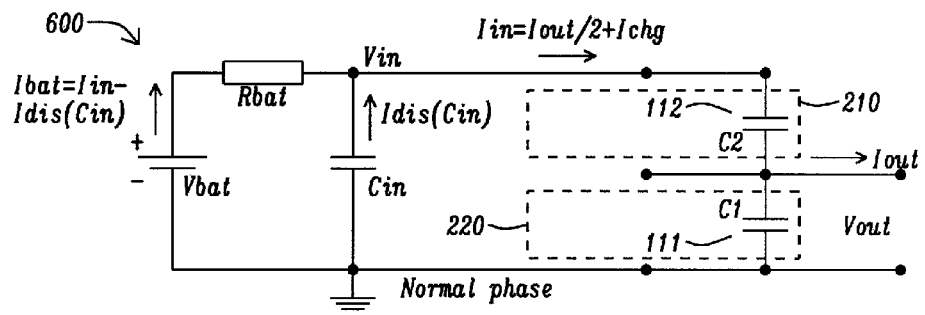
Figure 7A:
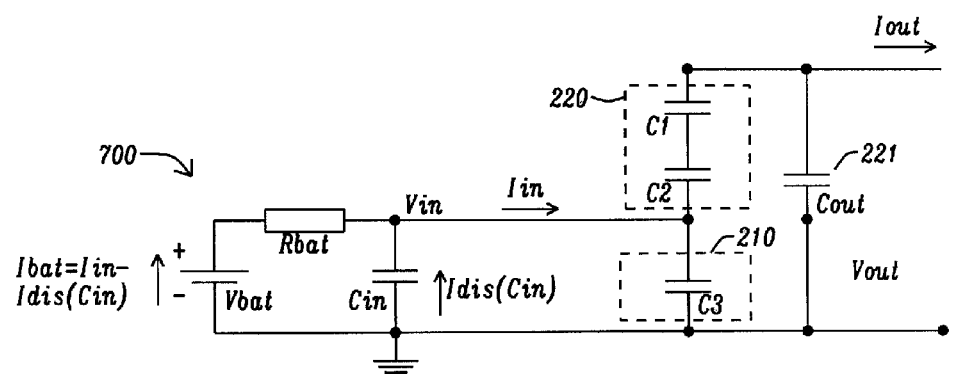
FIGS. 7a to 7f show circuit diagrams of an example switched capacitor DC-DC converter providing a step-up conversion.
Figure 7B:
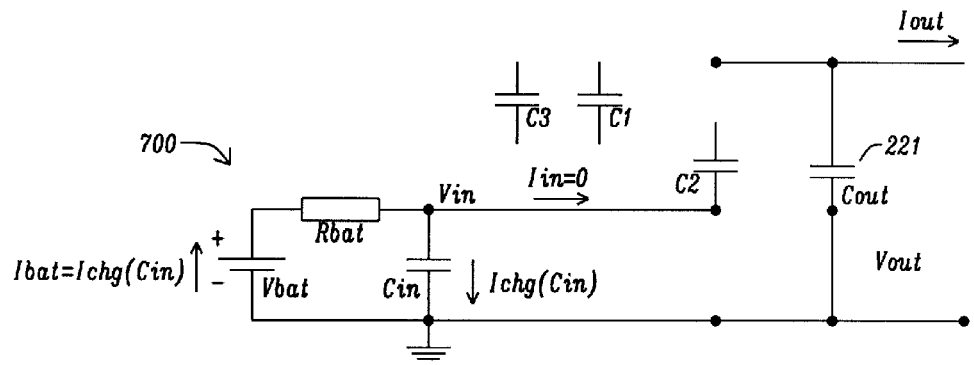
Figure 7C:
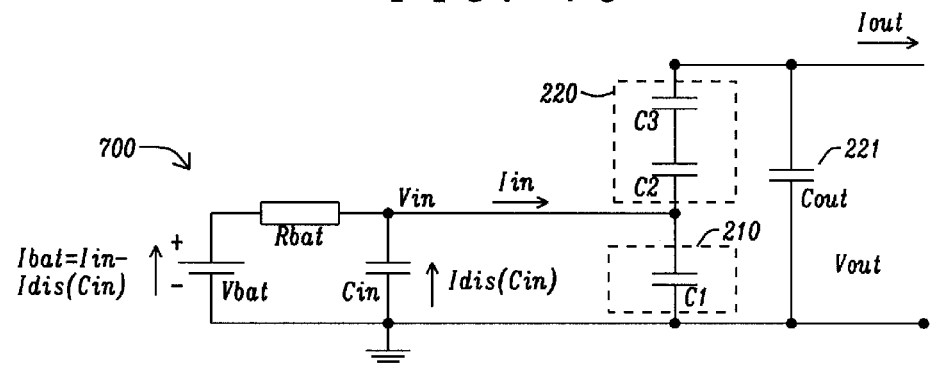
Figure 7D:
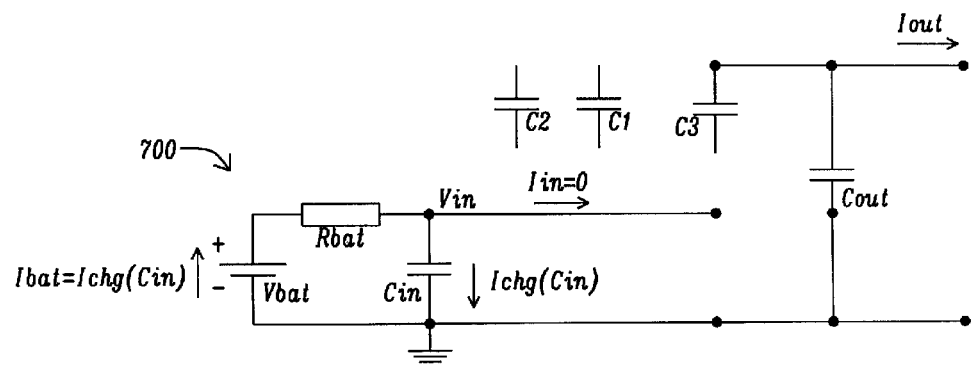
Figure 7E:
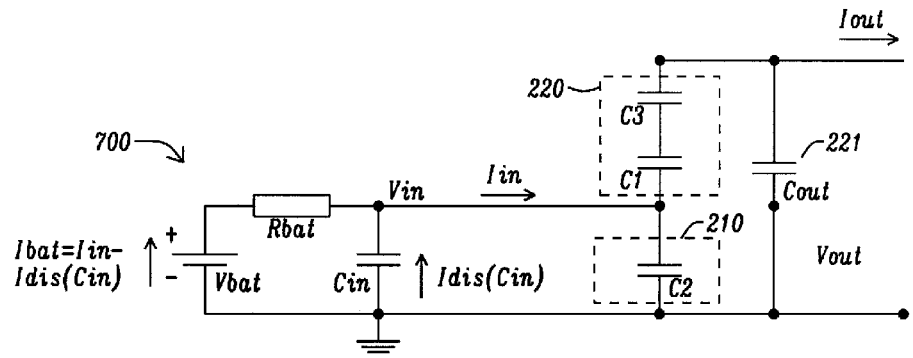
Figure 7F:
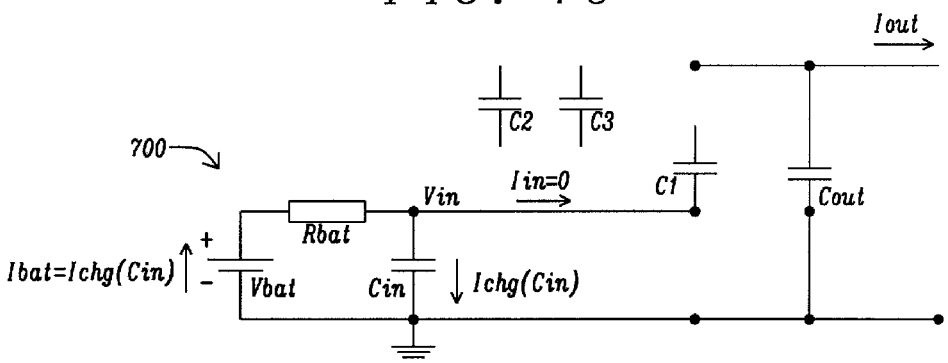

It should be noted that reservoir capacitors Cout 421, 221 may be completely removed by adding intermediate phases during which the flying capacitors C1 111, C2 112 are connected in parallel. This is shown in FIGS. 6a to 6e for the capacitive transformer 600. As shown in FIG. 6c the intermediate phases may be implemented by keeping the flying capacitor C2 112 of the discharging network 220 connected until another flying capacitor C1 111 has been connected in parallel to the flying capacitor C2 112. Only then the previous discharge capacitor C2 112 is disconnected (FIG. 6d) and connected to the charging network 210 (FIG. 6e). After this phase the circuit may return in a reverse sequence (from FIG. 6e to FIG. 6a) towards the start configuration (FIG. 6a).

The fact that (without the use of any reservoir capacitors 421, 221) a flying capacitor (C1 111 or C2 112) has to provide the full output current Iout during the transition phases (FIGS. 6b and 6d) typically increases the ripple on the output voltage Vout. Furthermore, the intermediate phase shown in FIG. 6c may trigger a non-adiabatic charge/discharge of the flying capacitors C2 112 and C1 111. As the flying capacitors 111, 112 are relatively large, the resulting switching loss can typically only be neglected in case the output voltage ripple is small and/or in case the duration of the intermediate phase is reduced.

Another variant of the intermediate phase approach shown in FIGS. 6a to 6e may be implemented by reverting the order of capacitor movement when connecting the flying capacitors C1 111, C2 112 during the intermediate phase in parallel inside the charging network. Also in this case, the input current Iin is increased during the intermediate phases to approximately Iout. In the alternative variant of the intermediate phase, a flying capacitor from the discharge network is arranged in parallel to a flying capacitor from the charging network, prior to moving the flying capacitor from the charging network to the discharge network.

A capacitive DC voltage multiplier 700 may be implemented by inverting the transformer input and output ports. FIGS. 7a to 7e show diagrams of a 1:3 voltage multiplier with a reservoir capacitor Cout 221 coupled to GND. The reservoir capacitor variants described in the context of FIGS. 3 to 6, with non switching reservoir capacitors in parallel to Vout and/or the discharge string, may be used accordingly in conjunction with the capacitive DC voltage multiplier 700 of FIGS. 7a to 7e. The DC voltage multiplier 700 may implement non-adiabatic loss when charging the flying capacitors, and the output voltage ripple may be reduced against a conventional serial-parallel switching capacitor DC converter.

Figure 8:
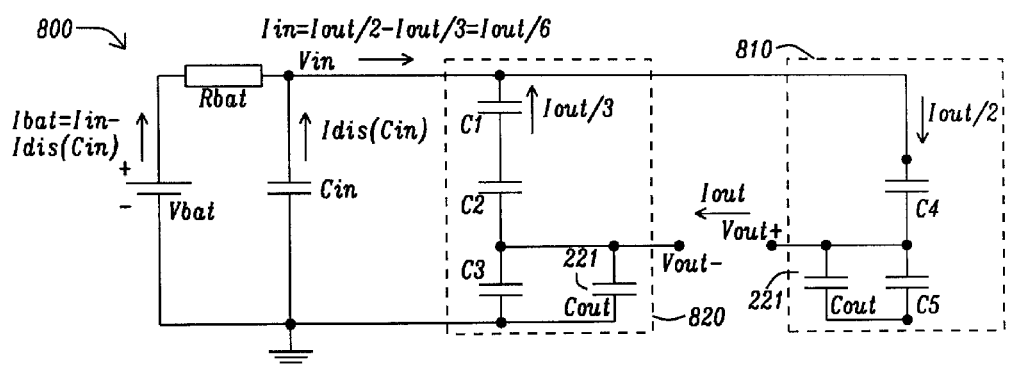
FIG. 8 shows a circuit diagram of an example switched capacitor DC-DC converter comprising a differential output.
Figure 9A:
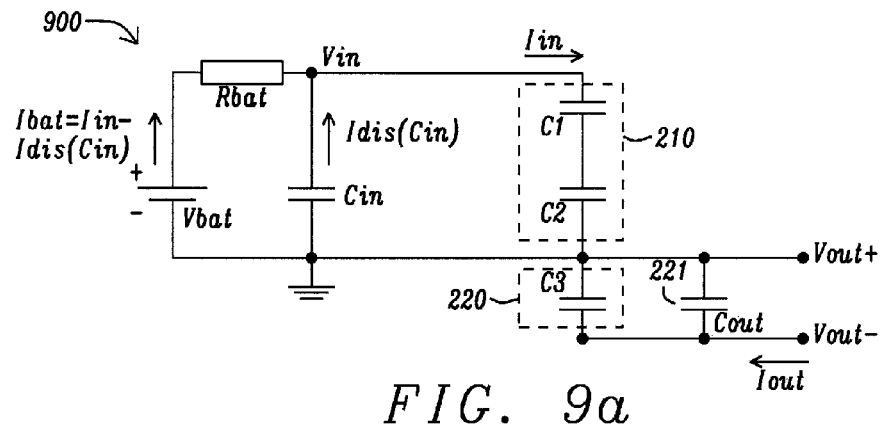
FIGS. 9a to 9f show circuit diagrams of an example switched capacitor DC-DC converter providing an output voltage at reverse polarity.
Figure 9B:
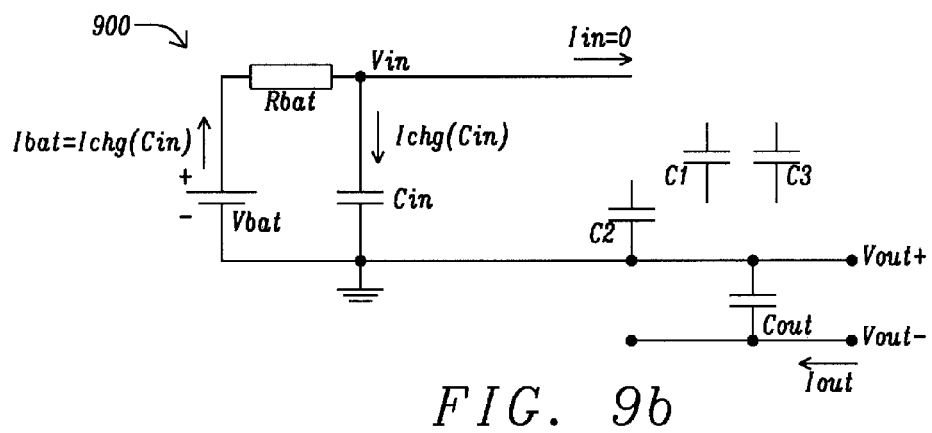
Figure 9C:
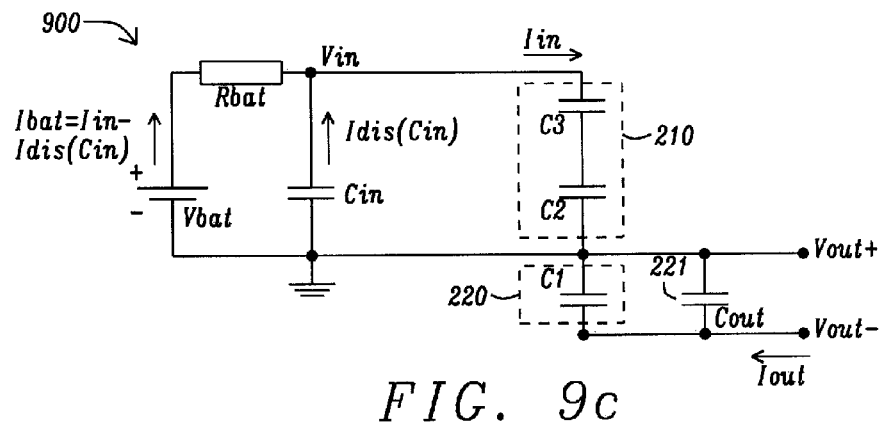
Figure 9D:
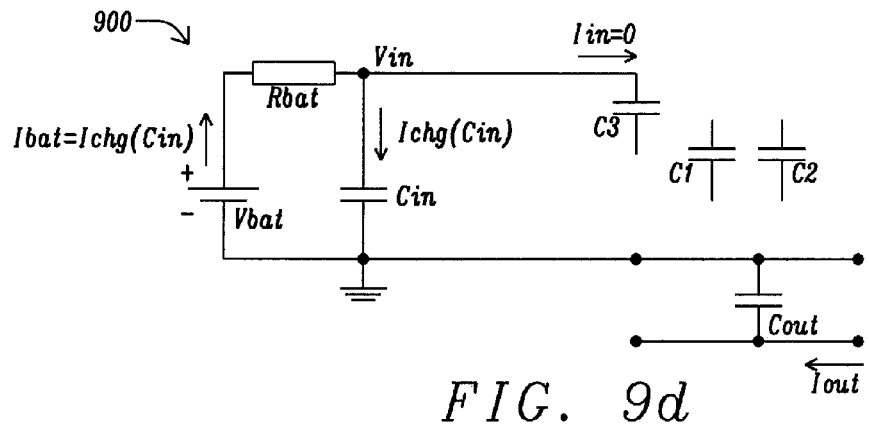
Figure 9E:
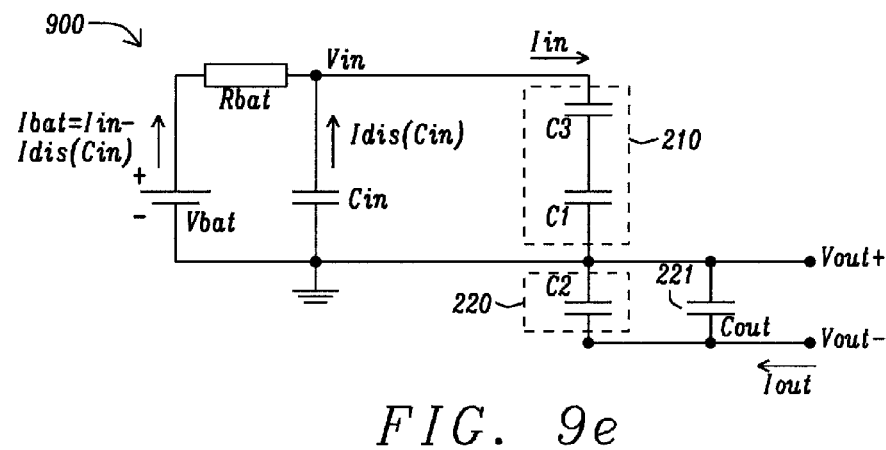
Figure 9F:
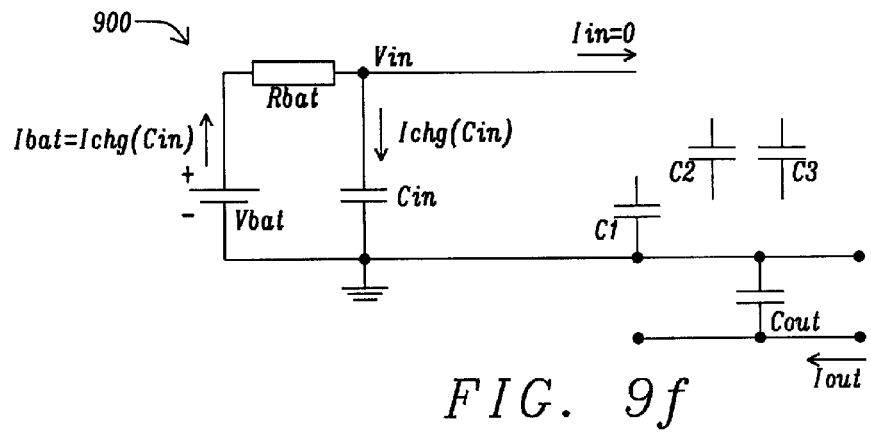

FIG. 8 shows an example for a differential voltage transformer 800 configured to provide increased input-to-output voltage ratios with a reduced number of flying capacitors. The differential voltage transformer 800 combines a voltage divider 810 (ratio n1:1) with a voltage multiplier 820 (ratio 1:n2), where n1 and n2 are arbitrary positive or negative integer values. The resulting voltage conversion ratio (Vout+−Vout−)/Vin is given by n1×n2/(n2−n1):1. It should be noted that a possible drawback of the differential voltage transformer 800 may be the different negative potential of the output voltage (i.e. Vout−) and of the battery voltage Vbat (i.e. GND). Furthermore, the fact that more current is flowing individually through the voltage divider path and through the multiplier path than is pulled from the input (i.e. Iin) may affect the conversion efficiency.

FIGS. 9a to 9f show an example transformer 900 providing an inverse output voltage Vout. The transformer 900 may be viewed as a derivate of the 3:1 voltage divider 300 shown in FIG. 3. The modified GND connection reduces the absolute input-to-output voltage ratio by the amount of switching capacitors inside the discharge string (towards 2:1), but implements a voltage inversion in parallel. The aspects described in the context of FIGS. 2 to 8 (e.g. with non-switching reservoir capacitors in parallel to ports Vout+/Vout− and/or connecting port Vin and port Vout−, voltage multiplication and/or differential transformation) may also be used in conjunction with the example transformer 900. When charging the flying capacitors the inverting divider 900 implements reduced input current ripple and non-adiabatic loss in comparison to a conventional serial-parallel topology. An inverting multiplier or inverter may implement non-adiabatic loss when charging the flying capacitors, and the output voltage ripple may be reduced against a conventional serial-parallel switching capacitor DC converter.

Figure 10:
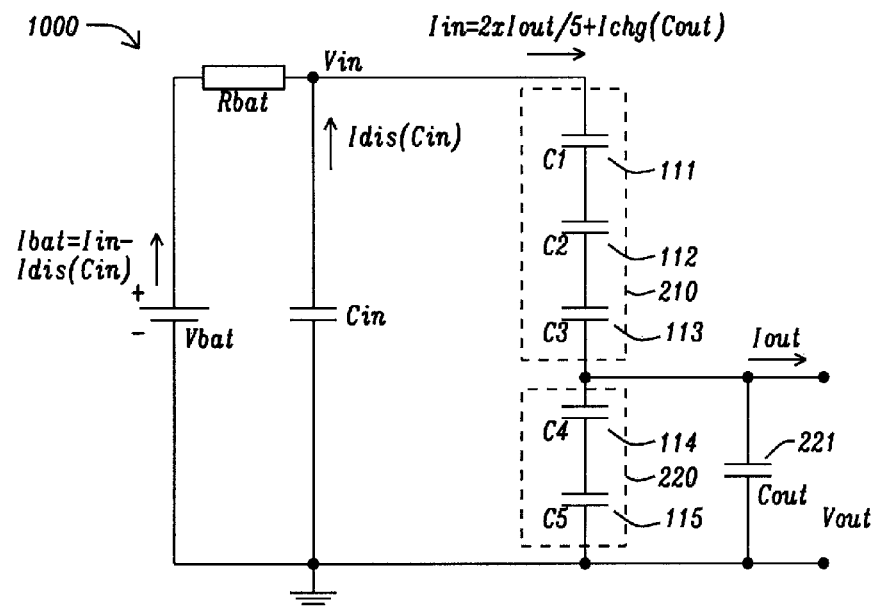
FIG. 10 shows a circuit diagram of an example switched capacitor DC-DC converter comprising multiple serial discharging capacitors.

A further example transformer 1000 is shown in FIG. 10. The transformer 1000 enables fractional input-to-output voltage ratios. As shown in FIG. 10, the voltage divider 1000 comprises a discharge network 220 comprising more than one flying capacitor C4 114, C5 115. The revolving sequence replaces each of the capacitors inside the discharge network 220 (with the exception of the reservoir capacitor Cout) with each of the capacitor C1 111, C2, 112, C3 113 from the charging network 210 before the revolving sequence is repeated. By way of example, the flying capacitors C1, C2, C3, C4, C5 may be circulated by removing the lowest capacitor (C5 in FIG. 10) from the capacitor string, and by inserting the removed capacitor at the top of the capacitor sting (in a similar manner to a circular queue). This process may be repeated, such that within a duty cycle each of the flying capacitors C1, C2, C3, C4, C5 is the lowest capacitor exactly once. Furthermore, the sequence of operation phases may be such that a particular flying capacitor enters the discharge network only subsequent to having been charged. This may be implemented by moving the flying capacitors by multiple locations up and down inside the serial arrangement. In other words, the sequence of operation phases may be such that it is ensured that an operation phase during which a particular flying capacitor is part of the discharge network is directly preceded by an operation phase during which the particular flying capacitor is part of the charging network. This may be beneficial with respect to reducing non-adiabatic losses.

This results in N=n(charging)+n(discharge) switching phases, wherein n(charging) may be the number of switching capacitors within the charging network 210 and wherein n(discharge) may be the number of switching capacitors within the discharge network 220. The input-to-output voltage ratio is given approximately by (n(discharge)+n(charging))/n(charging), which results in an input-to-output voltage ratio of 5/2 for the example transformer 1000 shown in FIG. 10 (with N=5 switching phases). The aspects described in the context of FIGS. 2 to 9 (e.g. different Cin and/or Cout configurations, voltage multiplication/inversion and/or the differential setup) may also be applied to the fractional transformation shown in FIG. 10.

Figure 11:
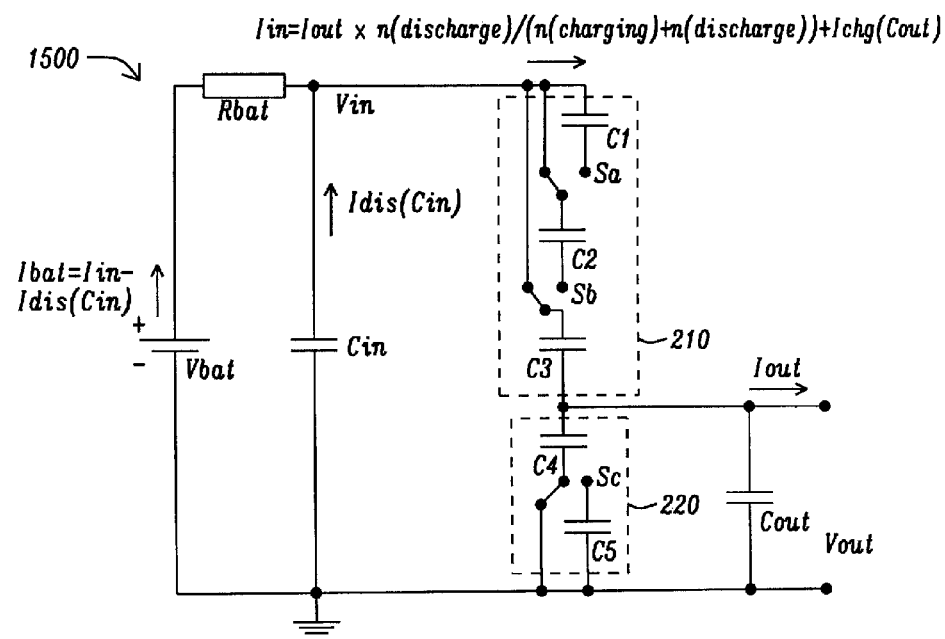
FIG. 11 shows a circuit diagram of an example switched capacitor DC-DC converter providing a configurable conversion ratio.
Figure 12:
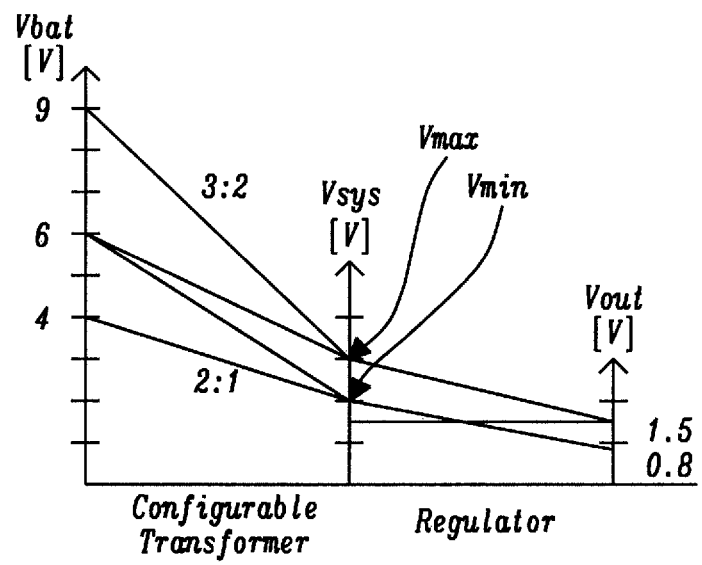
FIG. 12 shows a target control scheme for an example switched capacitor DC-DC converter providing dynamically configurable conversion ratios.

A further example transformer 1500 is shown in FIG. 11. By toggling the state of switches Sa, Sb and Sc flying capacitors can be removed from the serial string. As a result the input to output voltage ratio can be decreased or increased in discrete steps. This variation of the conversion ratio can be implemented dynamically i.e. for the provision of different output voltage levels Vout. FIG. 12 describes a target scheme to control the output voltage of the transformer to stay inside a certain Vmin to Vmax range despite a variable input voltage Vin. The example shows a typical Vbat range of a 2S battery stack. The DC transformer converts the range 6-9V towards an intermediate rail Vsys of 2-3V. As soon as the battery voltage drops below 6V the transformer changes the input to output voltage ratio from 3:2 to 2:1. By that the battery may be further discharged down to 4V even the intermediate rail remains in range.

In FIGS. 2 to 11, various different transformer designs have been described. The transformers make use of switching or flying capacitors. With the availability of large switching capacitors (e.g. in the range of 22 or 47 uF) in a small footprint (e.g. 0603) and less than 1 mm height, a typical capacitor-based voltage divider with less than 100 mV maximum voltage ripple may be able to provide multiple Amperes of output current Iout at a switching frequency of less than 500 kHz. This ensures negligible switching power loss at a maximum output power and typical conversion efficiency greater than 95%. It should be noted that the switching loss of the converters described in the present document is typically substantially independent from the output current Iout. This may result in a reduced conversion efficiency at low output currents Iout (as the switching loss stays constant, while the power provided to the load decreases).

As outlined above, the DC transformers which are described in the present document may be configured to pull a constant current Ibat from the power supply 101. In case of a voltage divider, the current Ibat is only a fraction of the output current Iout. The continuity of the current Ibat enables the use of variable switching frequencies (also for noise sensitive applications such as smartphones), thereby reducing switching loss at light loads and by that extending the high efficiency of the converter towards a wide output current Iout range. In case the switching frequency is reduced proportional to the output current Iout, the output voltage ripple remains constant. Using predefined switching capacitors C1, C2, C3, the required worst case ripple defines the switching frequency at a predetermined maximum output current Iout. If the output current Iout is reduced (e.g. due to a reduced load), the switching frequency may be reduced, thereby reducing switching loss and thereby maintaining a high conversion efficiency (e.g. of 95% or greater). It should be noted that the use of a (output current dependent) variable switching frequency may be applied to any of the capacitive transformers described in the present document.

A derivate of the above is a DC transformer with partially a fixed and a partially variable switching frequency. From the maximum output current Iout down to a pre-determined output current threshold the switching frequency may be maintained fixed at a predefined frequency. This ensures that higher output voltage ripple is generated at a predefined frequency required for filtering based on resonant networks. The output voltage ripple amplitude of the transformer is typically reduced with decreasing output current Iout. As soon as the ripple amplitude is below a pre-determined ripple level that is uncritical for noise sensitive applications (e.g. a pre-determined ripple level which may be suppressed sufficiently through cascaded regulators), the switching frequency may be allowed to be variable. The uncritical ripple amplitude typically determines the corresponding output current threshold for the capacitive DC transformer. As soon as the output current Iout drops below the pre-determined output current threshold, the switching frequency may be reduced in order to decrease the switching loss. In case the switching frequency is reduced, proportionally to the output current Iout, the ripple of the output voltage may be kept constant. By that the high efficiency of the capacitive transformer is extended towards light loads. On the other hand, the switching frequency is constant, and by that can be filtered with resonant filter networks whenever the output voltage ripple may cause critical noise that cannot be suppressed by the power supply rejection of cascaded regulators and other sinks. In other words, by providing a range of the output current Iout, where the switching frequency is maintained constant, and by allowing the switching frequency to be adaptive for output currents Iout below a pre-determined output current threshold, an improved trade-off between conversion efficiency and noise protection may be provided (notably for noise sensitive applications such as smartphones).

Figure 13:
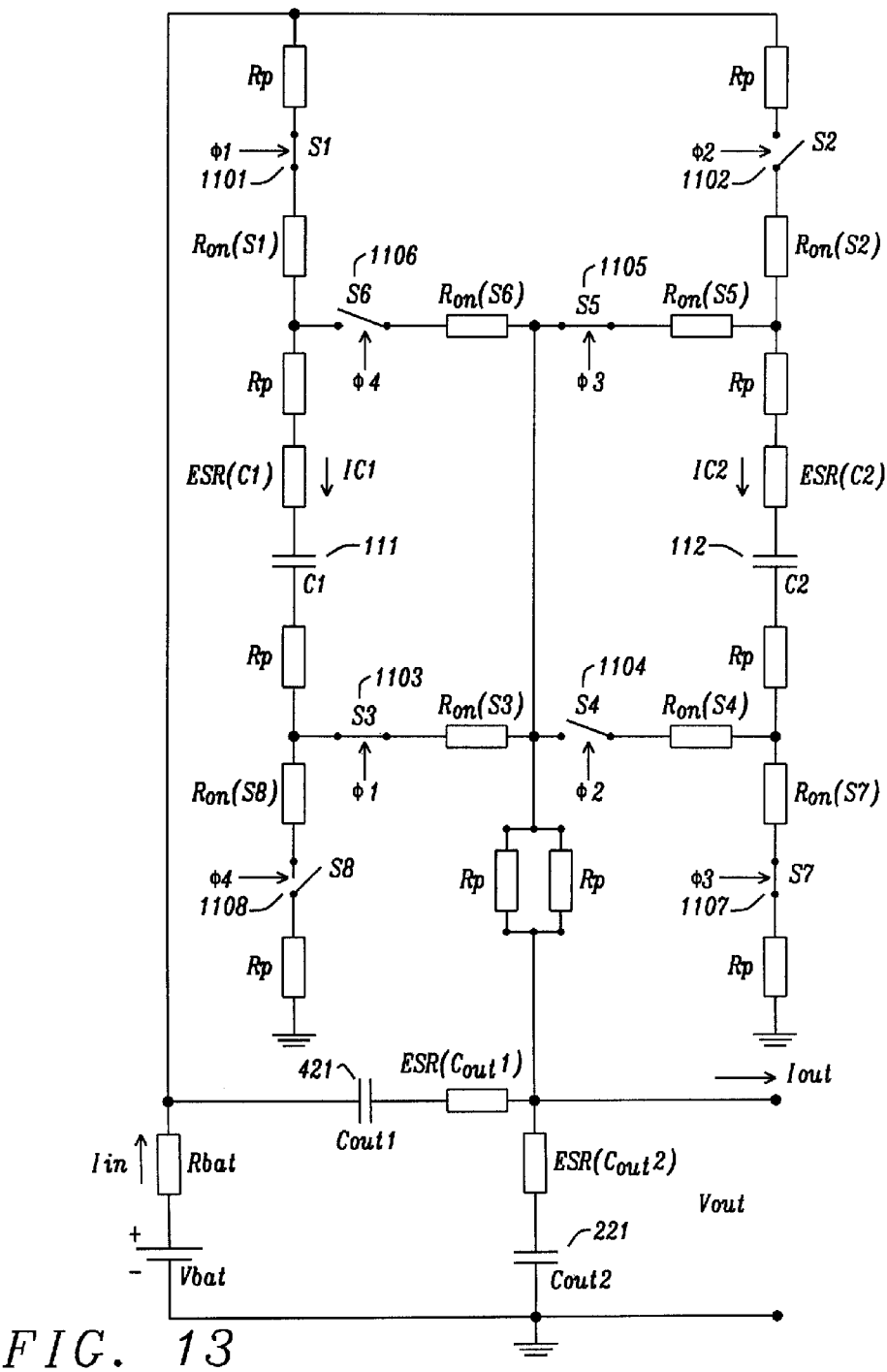
FIG. 13 shows an implementation of an example switched capacitor DC-DC converter.
Figure 14:
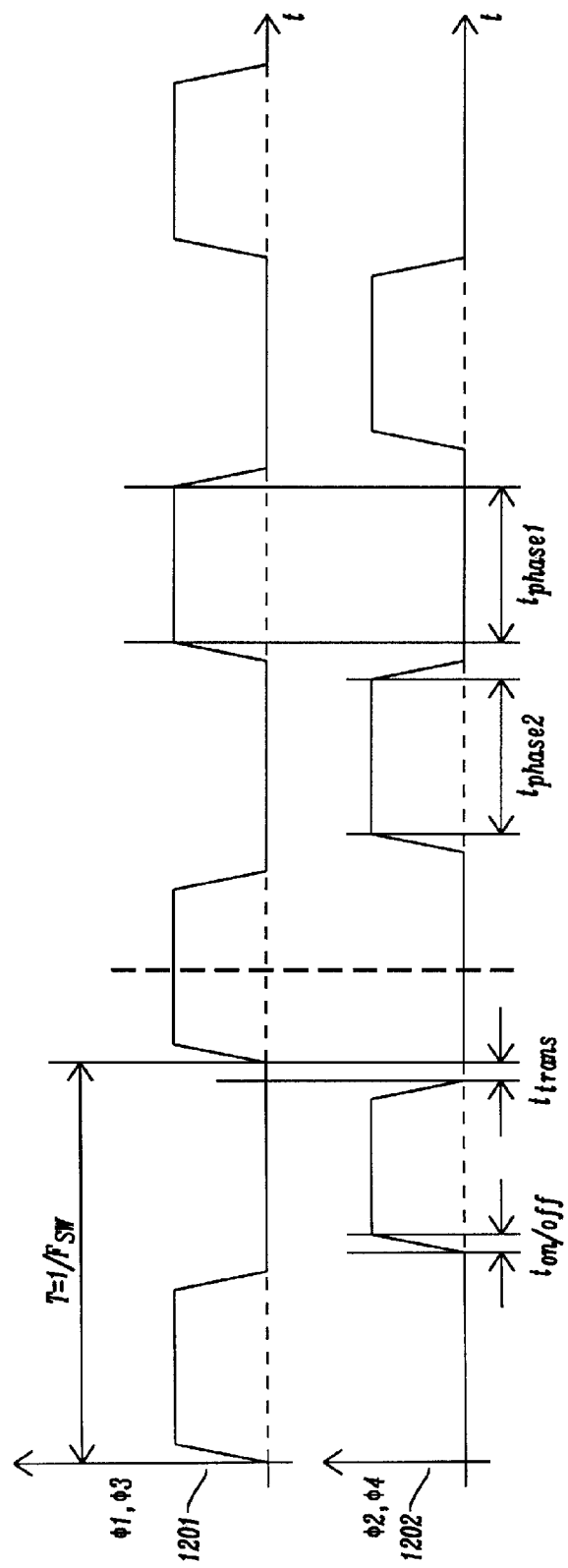
FIG. 14 shows an example timing diagram for the control of the switches of the example switched capacitor DC-DC converter of FIG. 13.

Details of a possible high power implementation of the 2:1 voltage divider 500 of FIG. 5 is shown in FIG. 13. The circuit of FIG. 13 illustrates example parameters influencing the transformer efficiency, such as the on-resistance of the switches S1 1101, S2 1102, S3 1103, S4 1104, S5 1105, S6 1106, S7 1107, S8 1108, the package/PCB interconnections impedances and the ESRs of the capacitors. The timing diagram of FIG. 14 shows example switch control signals $\phi 1$-$\phi 4$ for the switches of the voltage divider shown in FIG. 13. The implementation according to FIG. 5 assumes that $\phi 1$=$\phi 3$ 1201 and $\phi 2$=$\phi 4$ 1202.

Table 1 lists typical dimensions for the components of FIG. 13.

TABLE 1

$R_p$: Parasitic IC package and PCB interconnections impedance (8 mΩ)
C1/C2: Flying capacitors (47 uF)
ESR(C1/C2): Equivalent series resistance of capacitors (2 mΩ)
$C_{out}1$/$C_{out}2$: Output capacitors (1 uF)

TABLE 1-continued

ESR($C_{out}1/C_{out}2$): Equivalent series resistance of capacitors (10 mΩ)
$R_{on}$: Rdson of switches (20 mΩ)
$V_{bat}$: No-load output voltage of 2S battery pack (7.4 V)
$R_{bat}$: Internal impedance of 2S battery pack (100 mΩ)

Figure 15:
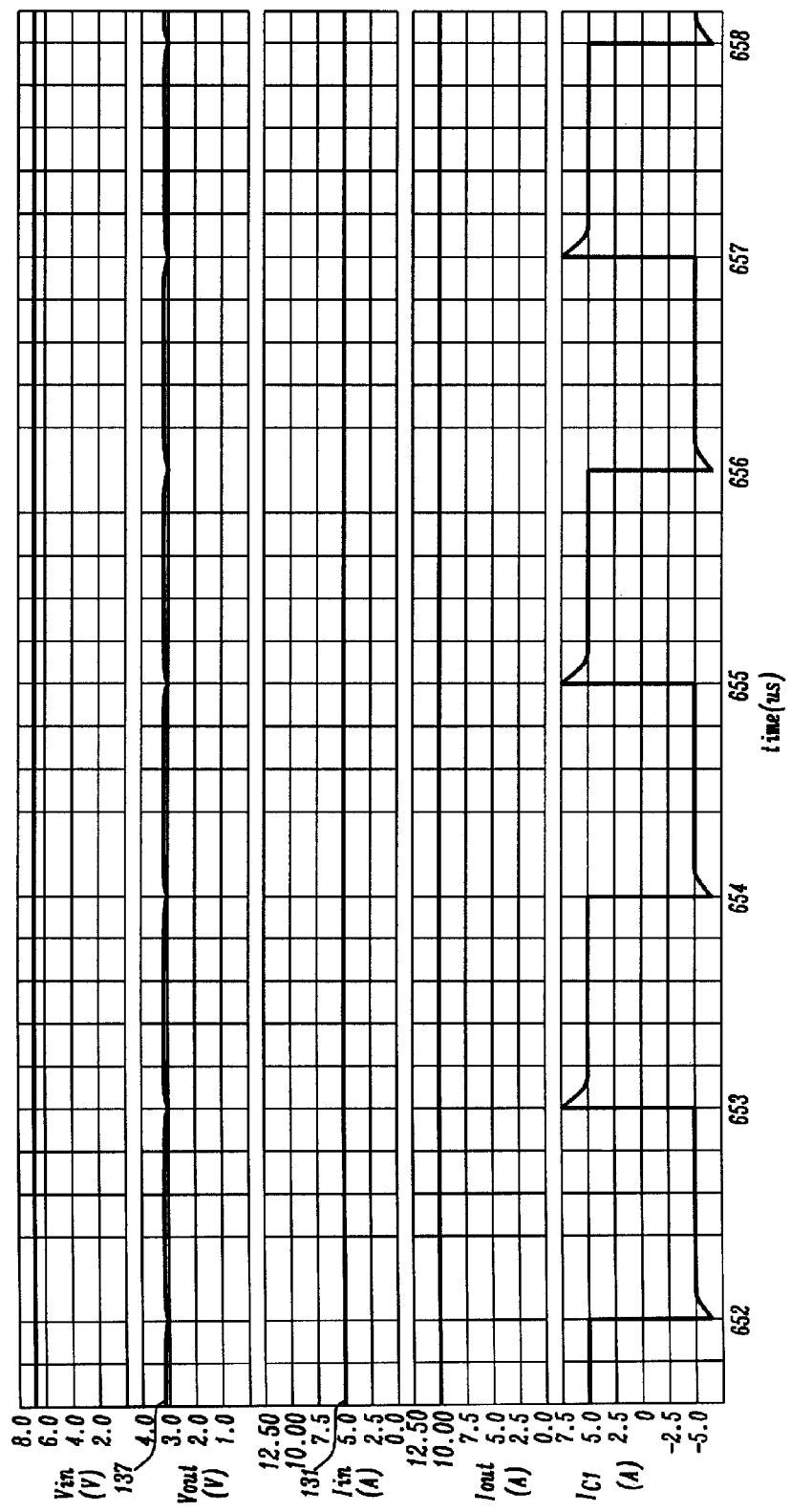
FIG. 15 shows example simulation results for the example switched capacitor DC DC converter of FIG. 13.

FIG. 15 shows a circuit simulation of the implementation of a voltage divider 500 according to FIG. 13 with Iout=10 A. It can be seen that the input current Iin 131 is substantially constant over time at approx. 5 A. In particular, it can be seen that the impact of the transition phase on the input current Iin 131 is negligible. The input current Iin 131 causes a voltage drop within the battery down to Vin=6.9V compared to the no-load voltage Vbat=7.4V. The output voltage Vout is approximately 3.1V, which, due to the circuit losses, is less than the ideal value of Vin/2~3.45V. The current through the flying capacitor C1 111 toggles between +5 A and −5 A with additional transient current at the beginning of each phase due to the reservoir capacitors Cout1 421 and Cout2 221 discharge/charge current.

Figure 16:
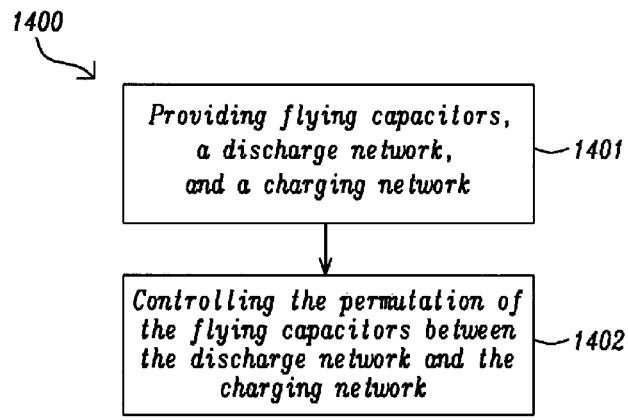
FIG. 16 shows a flow chart of an example method for providing power conversion using switched capacitors.

FIG. 16 shows a flow diagram of an example method 1400 for converting electrical power at a DC input voltage Vin 135 into electrical power at a DC output voltage 137. The method 1400 comprises providing 1401 flying capacitors, a discharge network, and a charging network controlling 1402 a plurality of switches 1101, 1102, 1103, 1104, 1105, 1106, 1107, 1108 to repeat a sequence of operation phases at a duty cycle frequency. As outlined above, the plurality of switches may be configured to arrange a plurality of flying capacitors 111, 112, 113 in accordance to the sequence of operation phases. The plurality of flying capacitors may be arranged in series during all of the operation phases of the sequence of operation phases. The sequence of operation phases may comprise at least two operation phases during which the plurality of flying capacitors are arranged in a different order.

The switched-capacitor DC-DC converters described in the present document may be used in conjunction with linear and switching regulators. Typical linear and switching regulators have good line regulation and supply ripple rejection and are therefore configured to tolerate a certain amount of input voltage ripple (provided at the output of the switched-capacitor DC-DC converters). Therefore capacitive DC voltage converters may be selected for the generation of intermediate power rails (e.g. for down-converting an increased battery voltage into a standard 1S battery voltage) and may be used as an input supply for cascaded power management solutions. This is especially true for the capacitive DC transformers described in the present document, as the constant input current enables variable switching frequency and by that extends the high conversion efficiency towards a wide output current range.

Figure 17:
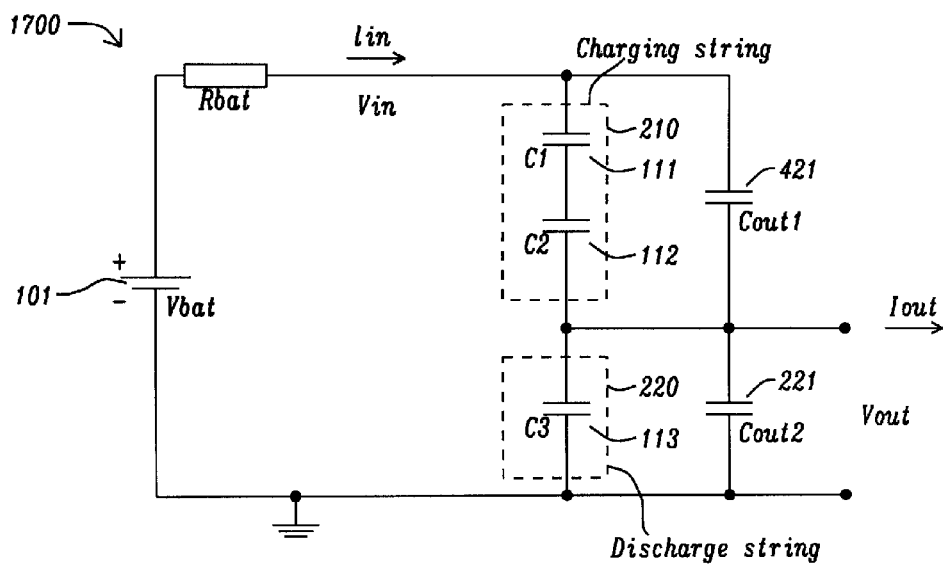
FIG. 17 shows circuit diagrams of an example switched capacitor DC-DC converter comprising a high side output capacitor and a low side output capacitor.

FIG. 17 shows a block diagram of an example power converter 1700 comprises a serial arrangement of three flying capacitors 111, 112, 113 and comprising reservoir capacitors 221 and 421.

As such, in the present document a solution to divide/multiply or invert a DC voltage via a switched-capacitor voltage converter is described. The capacitive DC transformers which are described in the present document provide a substantially constant input current, thereby enabling the provision of high conversion efficiencies. The input current Iin may be approximately Vout/Vin Iout (without conversion loss) and may be time continuous. This may be achieved by implementing a revolving series-series switched-capacitor string. The time continuous ratio of input-to-output current is similar to the case of an inductive AC transformer. Due to this, the disclosed DC-DC converter may be referred to as a capacitive DC transformer. Several variants of capacitive DC transformers with different configurations of reservoir capacitors, with and without input capacitors, variants for fractional input to output voltage ratio, a differential approach combining a voltage divider with a voltage multiplier and variants with fixed and/or variable switching frequency have been described. The disclosed DC transformer provides a cost and power efficient solution for high power conversion with an increased input-to-output voltage ratio. This may be achieved by generating at high efficiency an unregulated rail (using the disclosed DC transformer) which is then combined with conventional pre- or post-regulators with a reduced input-to-output voltage ratio.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to convert electrical power at a DC input voltage Vin into electrical power at a DC output voltage Vout, the power converter comprising
    a plurality of flying capacitors;
    a plurality of switches configured to arrange the plurality of flying capacitors in accordance to a sequence of operation phases;
    a control unit configured to control the plurality of switches to repeat the sequence of operation phases at a duty cycle frequency; wherein the plurality of flying capacitors is arranged in series during the operation phases of the sequence of operation phases; and wherein the sequence of operation phases comprises at least two operation phases during which the plurality of flying capacitors is arranged in a different order; wherein within each of the sequence of operation phases, a first subset of the plurality of flying capacitors forms a charging network which is being charged, and a second subset of the plurality of flying capacitors, which is complementary to the first subset, forms a discharge network which is being discharged; wherein the control unit is configured to control the plurality of switches to arrange the plurality of flying capacitors in accordance to at least one intermediate phase between a first and a succeeding second operation phase of the sequence of operation phases; and wherein during the intermediate phase a first flying capacitor which is part of the discharge network during the first operation phase and which is part of the charging network during the second operation phase is arranged in parallel to a second flying capacitor which is part of the charging network during the first operation phase and which is part of the discharge network during the second operation phase operation phase.

2. The power converter of claim 1, wherein
    in case of a voltage down-conversion, the serial arrangement of flying capacitors is arranged in parallel to the input voltage Vin during the operation phases of the sequence of operation phases; and the sequence of operation phases comprises at least two operation phases during which different subsets of the plurality of flying capacitors are arranged in parallel to the output voltage Vout; and/or in case of a voltage up-conversion, the serial arrangement of flying capacitors is arranged in parallel to the output voltage Vout during the operation phases of the sequence of operation phases; and the sequence of operation phases comprises at least two operation phases during which different subsets of the plurality of flying capacitors are arranged in parallel to the input voltage Vin; and/or in case of inversion, only a subset of the serial arrangement of flying capacitors is arranged in parallel to the input voltage Vin or the output voltage Vout during the operation phases of the sequence of operation phases.

3. The power converter of claim 1, wherein within each of the sequence of operation phases at least one of the plurality of flying capacitors is charged and at least one of the plurality of flying capacitors is discharged.

4. The power converter of claim 1, wherein the sequence of operation phases are such that each of the plurality of flying capacitors is part of the charging network at least during one of the sequence of operation phases and is part of the discharge network at least during another one of the sequence of operation phases.

5. The power converter of claim 1, further comprising
a first reservoir capacitor arranged in parallel to the charging network; and/or
a second reservoir capacitor arranged in parallel to the discharge network; wherein the arrangement of the first and/or second reservoir capacitor remains unchanged during the
sequence of operation phases.

6. The power converter of claim 5, wherein if the power converter comprises the first and second reservoir capacitors, the first reservoir capacitor is arranged to connect the input voltage Vin with the output voltage Vout and the second reservoir capacitor is arranged to connect the output voltage Vout with a reference potential of the input voltage Vin.

7. The power converter of claim 1, wherein a mid-point between charging network and discharge network is coupled to a reference potential of the input voltage Vin.

8. The power converter of claim 1, wherein
the plurality of flying capacitors comprise $N_T$ flying capacitors;
the charging network comprises $N_C$ flying capacitors;
the discharge network comprises $N_D$ flying capacitors, with $N_T = N_C + N_D$;
the sequence of operation phases comprises at least $N_T$ operation phases;
the operation phases are such that each of the plurality of flying capacitors is part of the charging network for at least $N_C$ phases and part of the discharge network for at least $N_D$ phases.

9. The power converter of claim 8, wherein a target ratio of the input voltage Vin and the output voltage Vout corresponds to
$N_D/N_T$ for voltage down-conversion; and/or
$N_T/N_D$ for voltage up-conversion; and/or
$N_C/N_D$ for voltage inversion.

10. The power converter of claim 1, wherein
the power converter further comprises one or more short cut switches (Sa, Sb, Sc) configured to short cut one or more of the plurality of flying capacitors; and
the control unit is configured to control the one or more short cut switches (Sa, Sb, Sc) in accordance to a conversion ratio between the input voltage and the output voltage to be provided by the power converter.

11. The power converter of claim 1, wherein
the control unit is configured to control the plurality of switches to arrange the plurality of flying capacitors in accordance to at least one transition phase for transiting from a first to a succeeding second operation phase of the sequence of operation phases;
during at least one transition phase, at least one of the plurality of flying capacitors is decoupled from the input voltage Vin and from the output voltage Vout.

12. The power converter of claim 1, wherein the control unit is configured to adapt the duty cycle frequency as a function of the amount of electrical power provided at the DC output voltage.

13. A method of providing a power converter which converts electrical power at a DC input voltage Vin into electrical power at a DC output voltage Vout, the power converter comprising the steps of:
providing a plurality of flying capacitors;
providing a plurality of switches which arrange said plurality of flying capacitors in accordance to a sequence of operation phases;
providing a control unit which controls said plurality of switches to repeat said sequence of operation phases at a duty cycle frequency; wherein said plurality of flying capacitors is arranged in series during said operation phases of said sequence of operation phases; and wherein said sequence of operation phases comprises at least two operation phases during which the plurality of flying capacitors is arranged in a different order; wherein within each of the sequence of operation phases, a first subset of the plurality of flying capacitors forms a charging network which is being charged, and a second subset of the plurality of flying capacitors, which is complementary to the first subset, forms a discharge network which is being discharged; wherein the control unit is configured to control the plurality of switches to arrange the plurality of flying capacitors in accordance to at least one intermediate phase between a first and a succeeding second operation phase of the sequence of operation phases; and wherein during the intermediate phase a first flying capacitor which is part of the discharge network during the first operation phase and which is part of the charging network during the second operation phase is arranged in parallel to a second flying capacitor which is part of the charging network during the first operation phase and which is part of the discharge network during the second operation phase operation phase.

14. The method of providing a power converter of claim 13, wherein
in case of a voltage down-conversion, said serial arrangement of flying capacitors is arranged in parallel to said input voltage Vin during said operation phases of said sequence of operation phases; and said sequence of operation phases comprises at least two operation phases during which different subsets of said plurality of flying capacitors are arranged in parallel to said output voltage Vout; and/or
in case of a voltage up-conversion, said serial arrangement of flying capacitors is arranged in parallel to said output voltage Vout during the operation phases of said sequence of operation phases; and said sequence of operation phases comprises at least two operation phases during which different subsets of said plurality of flying capacitors are arranged in parallel to said input voltage Vin; and/or in case of inversion, only a subset of said serial arrangement of flying capacitors is arranged in parallel to said input voltage Vin or said output voltage Vout during the operation phases of said-sequence of operation phases.

15. The method of providing a power converter of claim 13, wherein within each of said sequence of operation phases at least one of said plurality of flying capacitors is charged and at least one of said plurality of flying capacitors is discharged.

16. The method of providing a power converter of claim 13, wherein said sequence of operation phases are such that each of said plurality of flying capacitors is part of said charging network at least during one of said sequence of operation phases and is part of said discharge network at least during another one of said sequence of operation phases.

17. The method of providing a power converter of claim 13, further comprising
a first reservoir capacitor arranged in parallel to said charging network; and/or
a second reservoir capacitor arranged in parallel to said discharge network; wherein said arrangement of said first and/or second reservoir capacitor remains unchanged during said
sequence of operation phases.

18. The method of providing a power converter of claim 17, wherein if said power converter comprises said first and second reservoir capacitors, said first reservoir capacitor connects said input voltage Vin with said output voltage Vout and said second reservoir capacitor connects said output voltage Vout with a reference potential of said input voltage Vin.

19. The method of providing a power converter of claim 13, wherein a mid-point between charging network and discharge network is coupled to a reference potential of said-input voltage Vin.

20. The method of providing a power converter of claim 13, wherein
said plurality of flying capacitors comprise $N_T$ flying capacitors;
said charging network comprises $N_C$ flying capacitors;
said discharge network comprises $N_D$ flying capacitors, with $N_T = N_C + N_D$;
said sequence of operation phases comprises at least $N_T$ operation phases;
said operation phases are such that each of said plurality of flying capacitors is part of said charging network for at least $N_C$ phases and part of said discharge network for at least $N_D$ phases.

21. The method of providing a power converter of claim 20, wherein a target ratio of the input voltage Vin and the output voltage Vout corresponds to
$N_D/N_T$ for voltage down-conversion; and/or
$N_T/N_D$ for voltage up-conversion; and/or
$N_C/N_D$ for voltage inversion.

22. The method of providing a power converter of claim 13, wherein
said power converter further comprises one or more short cut switches (Sa, Sb, Sc) short cuts one or more of said plurality of flying capacitors; and
said control unit controls said one or more short cut switches (Sa, Sb, Sc) in accordance to a conversion ratio between said input voltage and said output voltage to be provided by said power converter.

23. The method of providing a power converter of claim 13, wherein
said control unit controls said plurality of switches to arrange said plurality of flying capacitors in accordance to at least one transition phase for transiting from a first to a succeeding second operation phase of said sequence of operation phases;
during said at least one transition phase, at least one of said plurality of flying capacitors is decoupled from said input voltage Vin and from said output voltage Vout.

24. The method of providing a power converter of claim 13, wherein said control unit adapts said duty cycle frequency as a function of said amount of electrical power provided at said DC output voltage.

* * * * *